(12) United States Patent
Kusano

(10) Patent No.: US 7,159,696 B2
(45) Date of Patent: Jan. 9, 2007

(54) HYDRAULIC BRAKING PRESSURE GENERATING APPARATUS FOR VEHICLES

(75) Inventor: Akihito Kusano, Tokyo (JP)

(73) Assignee: Advics Co., Ltd., Kariya (JP)

( * ) Notice: Subject to any disclaimer, the term of this patent is extended or adjusted under 35 U.S.C. 154(b) by 0 days.

(21) Appl. No.: 10/989,342

(22) Filed: Nov. 17, 2004

(65) Prior Publication Data

US 2005/0110341 A1 May 26, 2005

(30) Foreign Application Priority Data

Nov. 21, 2003 (JP) ............... 2003-391650
Nov. 21, 2003 (JP) ............... 2003-391651

(51) Int. Cl.
*B60T 11/10* (2006.01)
*B60T 11/20* (2006.01)

(52) U.S. Cl. ..................... 188/152; 60/562

(58) Field of Classification Search ............ 188/151 R, 188/152, 345, 353, 355, 356, 357, 358, 359, 188/360; 60/567, 568, 562, 563
See application file for complete search history.

(56) References Cited

U.S. PATENT DOCUMENTS 6,192,685 B1 2/2001 Bourlon et al.
6,349,806 B1 * 2/2002 Takayama et al. ............ 60/562
6,789,857 B1 * 9/2004 Kusano ..................... 60/582
6,978,869 B1 * 12/2005 Kusano ..................... 188/152
2005/0104443 A1 * 5/2005 Kusano ..................... 303/113.4
2005/0115236 A1 * 6/2005 Kusano ..................... 60/533

FOREIGN PATENT DOCUMENTS

| DE | 102004025638 A1 * | 9/2005 |
| JP | 11-59349 | 3/1999 |
| JP | 2001-526150 | 12/2001 |
| WO | WO 200172567 A1 * | 10/2001 |

\* cited by examiner

Primary Examiner—Thomas Williams
(74) Attorney, Agent, or Firm—Buchanan Ingersoll & Rooney PC

(57) ABSTRACT

A pressure generating apparatus includes a first piston moved in response to operation of a brake pedal, an elastic member for providing a stroke of the first piston in response to braking operation force of the brake pedal, a second piston accommodated in a housing for defining a master chamber in front of it and a simulator chamber behind it, and an atmospheric pressure reservoir for storing brake fluid. A changeover device is provided for selectively communicating the simulator chamber with the reservoir, or blocking the communication between them. And, a stroke restriction device is provided for restricting a maximal stroke of the first piston relative to the housing to be smaller than the sum of a maximal stroke of the second piston relative to the housing and a maximal stroke of the first piston relative to the second piston.

20 Claims, 9 Drawing Sheets

FIG. 7
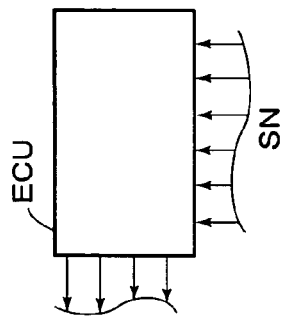
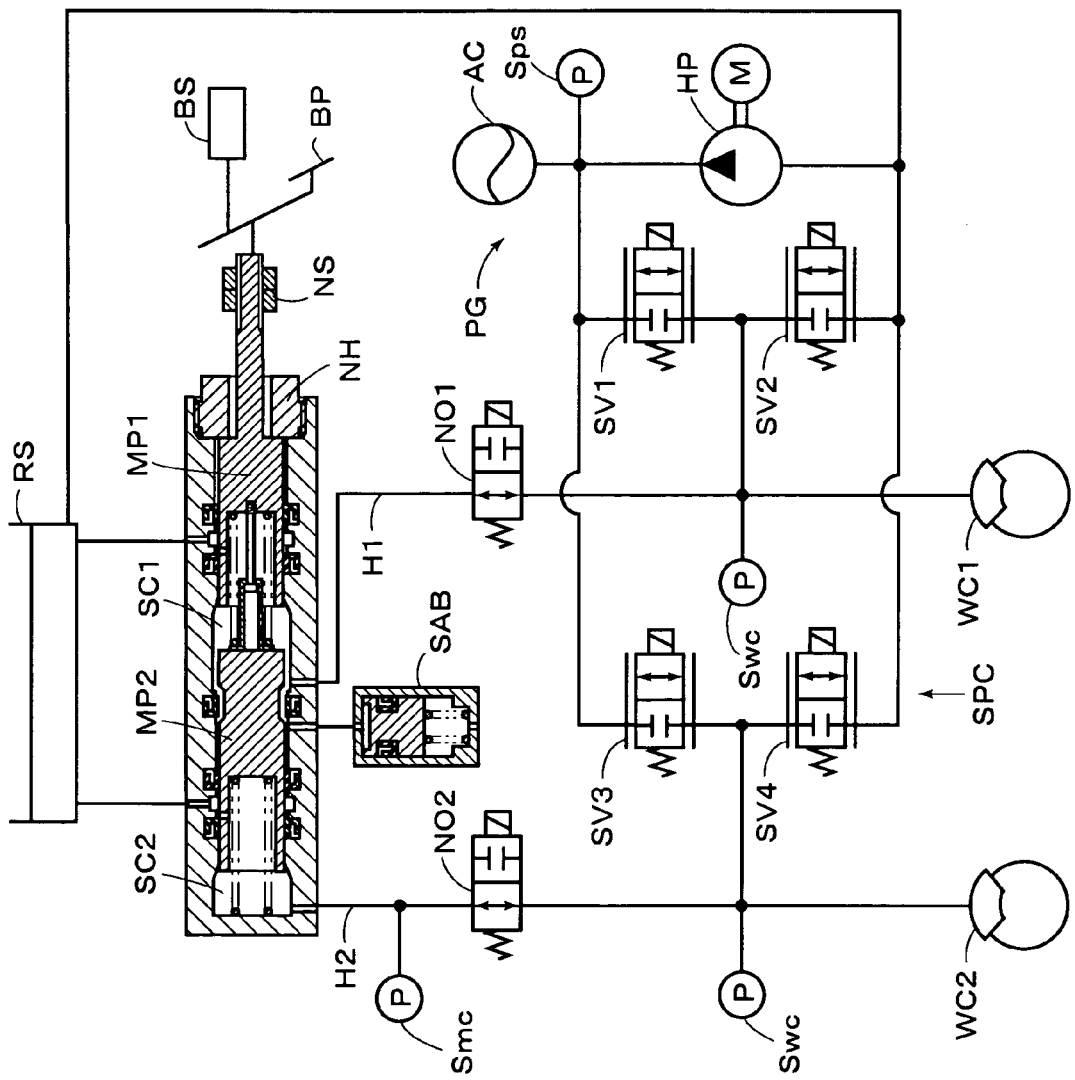

HYDRAULIC BRAKING PRESSURE GENERATING APPARATUS FOR VEHICLES

This application claims priorities under 35 U.S.C. Sec. 119 to Nos. 2003-391650 and 2003-391651 filed in Japan on Nov. 21, 2003, the entire contents of which are herein incorporated by reference.

BACKGROUND OF THE INVENTION

1. Field of the Invention

The present invention relates to a hydraulic braking pressure generating apparatus for vehicles, and more particularly, the hydraulic braking pressure generating apparatus provided with a barking stroke simulator.

2. Description of the Related Arts

Heretofore, there are known various hydraulic braking pressure generating apparatuses for vehicles, which are provided with braking stroke simulators. Among them, such an apparatus as discussed below has been disclosed in Japanese Patent Laid-open publication No. 11-59349. According to this publication, may be derived such an apparatus as constituted by a first piston which is moved back and forth in response to operation of a brake pedal, an elastic member which provides a stroke of the first piston in response to braking operation force of the brake pedal, and a second piston which is slidably accommodated in a cylinder housing to define a master pressure chamber in front of the second piston, and define a simulator chamber behind the second piston and in front of the first piston, and which is moved back and forth in response to the braking operation force of the brake pedal transmitted to the second piston through the first piston and the elastic member. And, a changeover device may be provided for selectively changing a communicating state for communicating the simulator chamber with an atmospheric pressure reservoir, and a cut-off state for blocking the communication between the simulator chamber and the atmospheric pressure reservoir.

In general, the stroke simulator is adapted to provide the brake pedal with a stroke in response to the braking operation force, when a pressure control device is normal, i.e., when the communication between the master cylinder and the wheel brake cylinder has been blocked. And, according to the hydraulic brake apparatus as disclosed in the Japanese Patent Laid-open publication No. 11-59349, the stroke simulator is disposed between the brake pedal and a master piston. In view of the fact that it is required to provide a large stroke of the brake pedal in response to a stroke of the stroke simulator, when the pressure control device is failed, i.e., when the hydraulic pressure is supplied from the master cylinder to the wheel brake cylinder, there is provided a cut-off device for blocking the communication between the simulator chamber and the atmospheric pressure resevoir in response to movement of the master piston.

In Japanese Patent Laid-open publication (PCT) 2001-526150, which corresponds to the U.S. Pat. No. 6,192,685 B1, may be derived such an apparatus as constituted by a first piston which is slidably accommodated in a cylinder housing, and moved back and forth in response to operation of a brake pedal, a second piston which is slidably accommodated in the cylinder housing to define a simulator chamber in front of the second piston, and which is moved back and forth in response to the braking operation force of the brake pedal transmitted to the second piston through the first piston and hydraulic pressure in the simulator chamber, and an elastic member which provides a stroke of the second piston in response to the braking operation force of the brake pedal. And, a changeover device may be provided for selectively changing a communicating state for communicating the simulator chamber with an atmospheric pressure reservoir, and a cut-off state for blocking the communication between the simulator chamber and the atmospheric pressure reservoir.

Furthermore, according to the Japanese Patent Laid-open publication (PCT) 2001-526150, may be derived an absorbing member which absorbs brake fluid of the amount determined in response to the hydraulic pressure discharged from the simulator chamber, and which provides a stroke of the second piston in response to braking operation force of the brake pedal. And, a changeover device may be provided for selectively providing an operative state of the absorbing member and an inoperative state of the absorbing member.

With respect to a general hydraulic brake apparatus, in order to remove air introduced into the brake fluid in a hydraulic braking circuit, a so-called air-bleeding operation is performed. According to the apparatuses as described above, however, when the air-bleeding operation is performed after it was installed on a vehicle, even if the changeover device was actuated, the stroke of the stroke simulator could not be prevented from being stroked, due to insufficiency of brake fluid to be filled, whereby both of the stroke simulator and the master piston would stroke simultaneously. Therefore, it is required to provide an appropriate distance for the sum of a maximal stroke of the stroke simulator and a maximal stroke of the master piston, so as to prevent the brake pedal from being interfered with a vehicle floor or the like. In order to meet this requirement, however, if the maximal stroke of the stroke simulator was set to be capable of obtaining a proper brake feeling when the pressure control device disposed in the hydraulic pressure circuit was normal. Therefore, if the pressure control device was failed, it would be a limit to be constituted that the maximal stroke of the master piston could supply only a minimal amount of brake fluid required for stopping the vehicle, into the wheel brake cylinder. In view of a reliability of the apparatus, therefore, an improvement to it has been required.

SUMMARY OF THE INVENTION

Accordingly, it is an object of the present invention to provide a hydraulic braking pressure generating apparatus for vehicles, which is provided with a braking stroke simulator, and which is capable of obtaining a proper brake feeling when a pressure control device disposed in a hydraulic pressure circuit is normal, and capable of supplying a sufficient amount of brake fluid for producing a large braking force to wheel brake cylinders, when the pressure control device is failed.

And, it is another object of the present invention to provide the hydraulic braking pressure generating apparatus for vehicles, which is capable of supplying the sufficient amount of brake fluid for producing the large braking force, substantially evenly to the wheel brake cylinders, when the pressure control device is failed.

In order to accomplish the above and other objects, the hydraulic braking pressure generating apparatus is provided with a first piston member which is moved back and forth in response to operation of a manually operated braking member, an elastic member for providing a stroke of the first piston member in response to braking operation force of the manually operated braking member, a second piston mem ber which is slidably accommodated in a cylinder housing for defining a master pressure chamber in front of the second piston member, and defining a simulator chamber behind the second piston member and in front of the first piston member, and which is moved back and forth in response to the braking operation force of the manually operated braking member transmitted to the second piston member through the first piston member and the elastic member, an atmospheric pressure reservoir for storing brake fluid under atmospheric pressure, a changeover device for selectively providing a communicating state for communicating the simulator chamber with the atmospheric pressure reservoir, and a cut-off state for blocking the communication between the simulator chamber and the atmospheric pressure reservoir, and a stroke restriction device for restricting a maximal stroke of the first piston member relative to the cylinder housing to be smaller than the sum of a maximal stroke of the second piston member relative to the cylinder housing and a maximal stroke of the first piston member relative to the second piston member.

Or, the hydraulic braking pressure generating apparatus may be provided with a first piston member which is moved back and forth in response to operation of a manually operated braking member, a second piston member which is slidably accommodated in a cylinder housing for defining a master pressure chamber in front of the second piston member, and defining a simulator chamber behind the second piston member and in front of the first piston member, and which is moved back and forth in response to the braking operation force of the manually operated braking member transmitted to the second piston member through the first piston member and hydraulic pressure in the simulator chamber, an absorbing device which absorbs brake fluid of the amount determined in response to the hydraulic pressure discharged from the simulator chamber, and which provides a stroke of the first piston member in response to the braking operation force of the manually operated braking member, a changeover device for selectively providing an operative state of the absorbing device and an inoperative state of the absorbing device, and a stroke restriction device for restricting a maximal stroke of the first piston member relative to the cylinder housing to be smaller than the sum of a maximal stroke of the second piston member relative to the cylinder housing and a maximal stroke of the first piston member relative to the second piston member.

In the hydraulic braking pressure generating apparatuses as described above, preferably, the stroke restriction device is constituted to set the maximal stroke of the first piston member relative to the cylinder housing to be larger than the maximal stroke of the first piston member relative to the second piston member. The stroke restriction device may include a restricted stroke setting device for adjusting the maximal stroke of the first piston member relative to the cylinder housing.

The hydraulic braking pressure generating apparatus may be provided with a first piston member which is slidably accommodated in a cylinder housing for defining a master pressure chamber in front of the first piston member, and which is moved back and forth in response to operation of a manually operated braking member, a second piston member which is slidably accommodated in the cylinder housing for defining a simulator chamber in front of the second piston member, and which is moved back and forth in response to the braking operation force of the manually operated braking member transmitted to the second piston member through the first piston member and hydraulic pressure in the master pressure chamber, an elastic member for providing a stroke of the second piston member in response to braking operation force of the manually operated braking member, an atmospheric pressure reservoir for storing brake fluid under atmospheric pressure, and a changeover device for selectively providing a communicating state for communicating the simulator chamber with the atmospheric pressure reservoir, and a cut-off state for blocking the communication between the simulator chamber and the atmospheric pressure reservoir, and a stroke restriction device for restricting a maximal stroke of the first piston member relative to the cylinder housing to be smaller than the sum of a maximal stroke of the second piston member relative to the cylinder housing and a maximal stroke of the first piston member relative to the second piston member.

Or, the hydraulic braking pressure generating apparatus may be provided with a first piston member which is slidably accommodated in a cylinder housing for defining a master pressure chamber in front of the first piston member, and which is moved back and forth in response to operation of a manually operated braking member, a second piston member which is slidably accommodated in the cylinder housing for defining a simulator chamber in front of the second piston member, and which is moved back and forth in response to the braking operation force of the manually operated braking member transmitted to the second piston member through the first piston member and hydraulic pressure in the master pressure chamber, an absorbing device which is communicated with the simulator chamber for absorbing brake fluid of the amount determined in response to the hydraulic pressure discharged from the simulator chamber, and which provides a stroke of the second piston member in response to the braking operation force of the manually operated braking member, a changeover device for selectively providing an operative state of the absorbing device and an inoperative state of the absorbing device, and a stroke restriction device for restricting a maximal stroke of the first piston member relative to the cylinder housing to be smaller than the sum of a maximal stroke of the second piston member relative to the cylinder housing and a maximal stroke of the first piston member relative to the second piston member.

In the hydraulic braking pressure generating apparatus as described above, preferably, the stroke restriction device is constituted to set the maximal stroke of the first piston member relative to the cylinder housing to be larger than the maximal stroke of the second piston member relative to the cylinder housing. The stroke restriction device may include a restricted stroke setting device for adjusting the maximal stroke of the first piston member relative to the cylinder housing.

Furthermore, the hydraulic braking pressure generating apparatus may be provided with a first master piston which is slidably accommodated in a cylinder housing for being moved back and forth in response to operation of a manually operated braking member, a second master piston which is slidably accommodated in the cylinder housing for defining a first master chamber between the first master piston and the second master piston, and defining a second master chamber between the second master piston and the cylinder housing, a stroke simulator for absorbing brake fluid and providing a stroke of one of the first master piston and the second master piston in response to braking operation force of the manually operated braking member, a changeover device for selectively providing an operative state of the stroke simulator and an inoperative state of the stroke simulator, and a stroke restriction device for restricting a maximal stroke of the first master piston relative to the cylinder housing to be smaller than the sum of a maximal stroke of the second master piston relative to the cylinder housing and a maximal stroke of the first master piston relative to the second master piston. The stroke simulator may be so constituted to be communicated with the first master chamber for absorbing brake fluid of the amount determined in response to the hydraulic pressure discharged from the first master chamber, and to provide a stroke of the first master piston in response to braking operation force of the manually operated braking member. Or, the stroke simulator may be so constituted to be communicated with the second master chamber for absorbing brake fluid of the amount determined in response to the hydraulic pressure discharged from the second master chamber, and to provide a stroke of the second master piston in response to braking operation force of the manually operated braking member.

In the hydraulic braking pressure generating apparatus as described immediately above, the stroke restriction device may include a restricted stroke setting device for adjusting the maximal stroke of the first master piston relative to the cylinder housing. The restricted stroke setting device may include a first piston stopper which is screwed into the first master piston. Or, the restricted stroke setting device may include a second piston stopper which is stuffed into the first master piston. Furthermore, the restricted stroke setting device may include a third piston stopper which is deformed to fix the first master piston.

BRIEF DESCRIPTION OF THE DRAWINGS

The above stated object and following description will become readily apparent with reference to the accompanying drawings, wherein like reference numerals denote like elements, and in which:

FIG. 7 is a schematic block diagram of a hydraulic brake apparatus having a hydraulic braking pressure generating apparatus according to an embodiment with a separate stroke simulator of the present invention;

DESCRIPTION OF THE PREFERRED EMBODIMENTS

Figure 1:
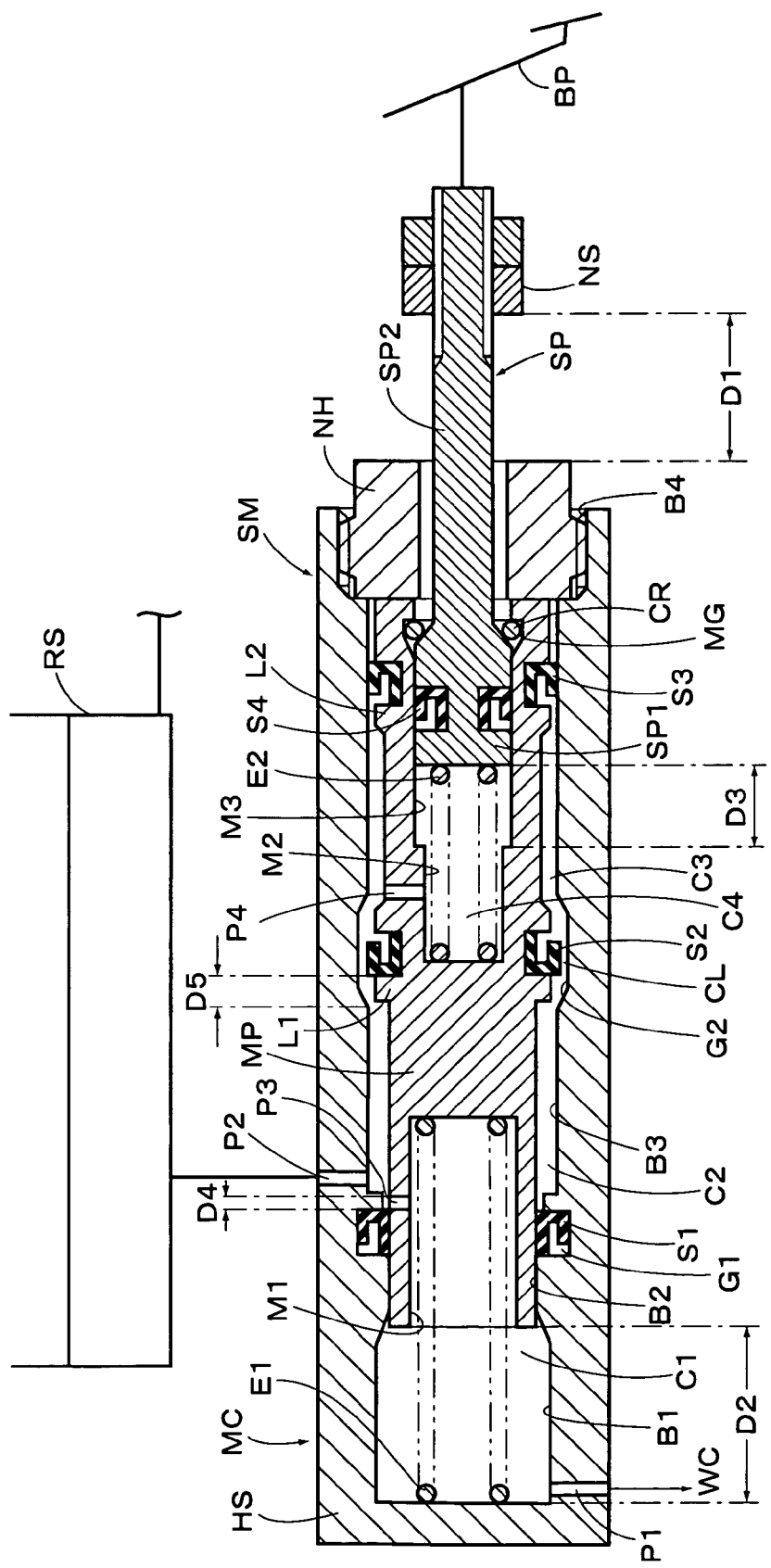
FIG. 1 is a sectional view of a hydraulic braking pressure generating apparatus for vehicles according to an embodiment of the present invention.

Referring to FIG. 1, there is illustrated a hydraulic braking pressure generating apparatus for vehicles according to an embodiment of the present invention, wherein a master cylinder MC and a stroke simulator SM are formed in a body, and wherein a master piston MP served as the second piston member of the present invention is slidably accommodated in a cylinder housing HS (hereinafter, simply referred to as housing HS). Furthermore, a simulator piston SP served as the first piston member of the present invention is slidably accommodated in the master piston MP. The housing HS is closed in its front end (left in FIG. 1) to be formed in a cylinder with a bottom, and formed with a cylinder bore having a stepped bore of a recess B1, a small diameter bore B2 and a large diameter bore B3. At the rear end of the housing HS, there is formed an open end portion B4 with threaded grooves formed on its inner surface. On the inner surface of the small diameter bore B2, an annular groove G1 is formed for holding a seal member S1 having a cup-like cross section, whereas on the inner surface of the large diameter bore B3, there is formed an annular groove G2 having a certain width along the longitudinal axis of the bore B3. On the side wall of the housing HS, there are formed a port P1 opening into the recess B1, and a port P2 opening into the large diameter bore B3 near the small diameter bore B2. The housing HS may be made of a single metallic member, because the recess B1, small diameter bore B2, large diameter bore B3, open end portion B4, and annular grooves G1 and G2 can be formed by boring the housing HS along the longitudinal axis thereof.

As for the master piston MP, there are formed at its front end a recess M1 opening forward, and formed at its rear end a recess opening rearward, in the latter of which a cylinder bore is formed to provide a stepped bore of a small diameter bore M2 and a large diameter bore M3. On the inner surface of the large diameter bore M3 near the open end thereof, an annular groove MG is formed for holding a C-ring CR. On the side wall of the master piston MP, there are formed a port P3 opening into the recess M1, and a port P4 opening into the small diameter bore M2. A land portion L1 is formed around the outer peripheral surface of a middle portion of the master piston MP, and a land portion L2 is formed around the outer peripheral surface of its rear portion, with annular grooves formed on their outer peripheral surfaces, to hold therein annular seal members S2 and S3 having a cup-like cross section, respectively.

The simulator piston SP has a large diameter piston portion SP1 to be slidably accommodated in the large diameter bore M3, and a small diameter axial portion SP2 extending backward from the former. On the outer peripheral surface of the piston portion SP1, there is formed an annular groove for holding therein an annular seal member S4 having a cup-like cross section. The axial portion SP2 is connected to a brake pedal BP served as the manually operated braking member of the present invention.

Next will be explained the parts as described above, according to an example of a sequence of steps for assembling them. At the outset, a compression spring E2 served as an elastic member for the simulator is received into the small diameter bore M2 and large diameter bore M3 of the master piston MP. Then, the simulator piston SP with the seal member S4 mounted thereon is fluid-tightly and slidably received into the large diameter bore M3 to define a simulator chamber C4 in front of the piston portion SP1. With the piston portion SP1 accommodated in the large diameter bore M3, fitted into the annular groove MG of the master piston MP is the C-ring CR, which prevents the simulator piston SP from being moved backward by means of biasing force of the compression spring E2. Consequently, a maximal stroke (D3) of the simulator piston SP (first piston member) relative to the master piston MP (second piston member) is set. Then, the seal members S2 and S3 are mounted on the land portions L1 and L2 of the master piston MP, respectively.

Next, the seal member S1 is fitted into the annular groove G1 of the housing HS, and a compression spring E1 served as a return spring is received in the recess B1 of the housing HS and the recess M1 of the master piston MP, and then the master piston MP is fitted into the small diameter bore B2 and large diameter bore B3. Consequently, the master piston MP is fluid-tightly and slidably accommodated in the small diameter bore B2 and large diameter bore B3, through the seal members S1 and S3, respectively. Thus, with the master piston MP accommodated in the small diameter bore B2 and large diameter bore B3 of the housing HS, screwed into the open end portion B4 of the housing HS is a nut-like annular stopper NH with threaded grooves formed on its outer peripheral surface, which prevents the master piston MP from being moved rearward against the biasing force of the compression spring E1, to act as an annular blocking member. Consequently, a maximal stroke (D2) of the master piston MP (second piston member) is set relative to the housing HS. Also, a maximal stroke (D1) of the simulator piston SP (first piston member) relative to the stopper NH (resultantly, housing HS) is set by a piston stopper NS, which includes a pair of nuts. As it is so constituted that the nuts of the piston stopper NS are meshed with a threaded portion of the simulator piston SP formed at the rear end portion thereof, and that the nuts are tightened from the opposite sides thereof, the nuts will be hardly rotated, after they are fixed at a predetermined position.

The distance (D1) between the stopper NH and the piston stopper NS is set relative to each part with its dimension set in advance, to provide the following relationship. That is, with the fixed position of the piston stopper NS being adjusted relative to the axial portion SP2, the maximal stroke (D1) of the simulator piston SP (first piston member) relative to the housing HS (stopper NH in FIG. 1) is restricted to be smaller than the sum of the maximal stroke (D2) of the master piston MP (second piston member) relative to the housing HS and the maximal stroke (D3) of the simulator piston SP (first piston member) relative to the master piston MP (second piston member), i.e., [D1<(D2+D3)]. Thus, the piston stopper NS is served as the restricted stroke setting device. And, the stroke restriction device includes the piston stopper NS, by which a dimensional relationship of each part is adjusted.

At the same time, according to the present embodiment, the maximal stroke (D1) of the simulator piston SP (first piston member) relative to the housing HS is set to be larger than the maximal stroke (D3) of the simulator piston SP (first piston member) relative to the master piston MP (second piston member), i.e., (D1>D3). Furthermore, the maximal stroke (D1) of the simulator piston SP (first piston member) relative to the housing HS is set to be slightly smaller than the maximal stroke (D2) of the master piston MP (second piston member) relative to the housing HS, i.e., (D1<D2), as will be described later.

With those parts assembled as described above, the master pressure chamber C1 is defined in front of the master piston MP in the master cylinder MC, to be communicated with a wheel brake cylinder WC through the port P1 (via an electromagnetic switching valve NO as described hereinafter). An atmospheric pressure chamber C2 is formed between the seal members S1 and S2 held on the inner peripheral surface of the housing HS, and an annular chamber C3 is formed between the seal members S2 and S3, so that the atmospheric pressure chamber C2 is so constituted to be always communicated with an atmospheric pressure reservoir RS (hereinafter, simply referred to as a reservoir RS) through the port P2. When the master piston MP is placed in its initial position as shown in FIG. 1, therefore, the master pressure chamber C1 is communicated with the atmospheric pressure chamber C2 through the port P3, and finally communicated with the reservoir RS under the atmospheric pressure, through the port P2. On the contrary, when the master piston MP is advanced from its initial position by a first stroke (D4) or more, the opening area of the port P3 is closed by the seal member S1, thereby to block the communication between the master pressure chamber C1 and the atmospheric pressure chamber C2 (and the reservoir RS).

At the same time, when the master piston MP is placed in its initial position as shown in FIG. 1, the atmospheric pressure chamber C2 is communicated with the annular chamber C3 through a clearance CL between the seal member S2 and the annular groove G2, and therefore the simulator chamber C4 is communicated with the annular chamber C3 and the atmospheric pressure chamber C2 through the port P4, whereby the simulator chamber C4 is communicated with the reservoir RS through the port P2. And, when the master piston MP is advanced from the initial position thereof by a second stroke (D5), which is greater than the first stroke, or more, the communication between the annular chamber C3 (then, the simulator chamber C4) and the atmospheric pressure chamber C2 will be blocked by the seal member S2 and the inner surface of the large diameter bore B3, whereby the changeover device of the present invention is constituted.

Figure 2:
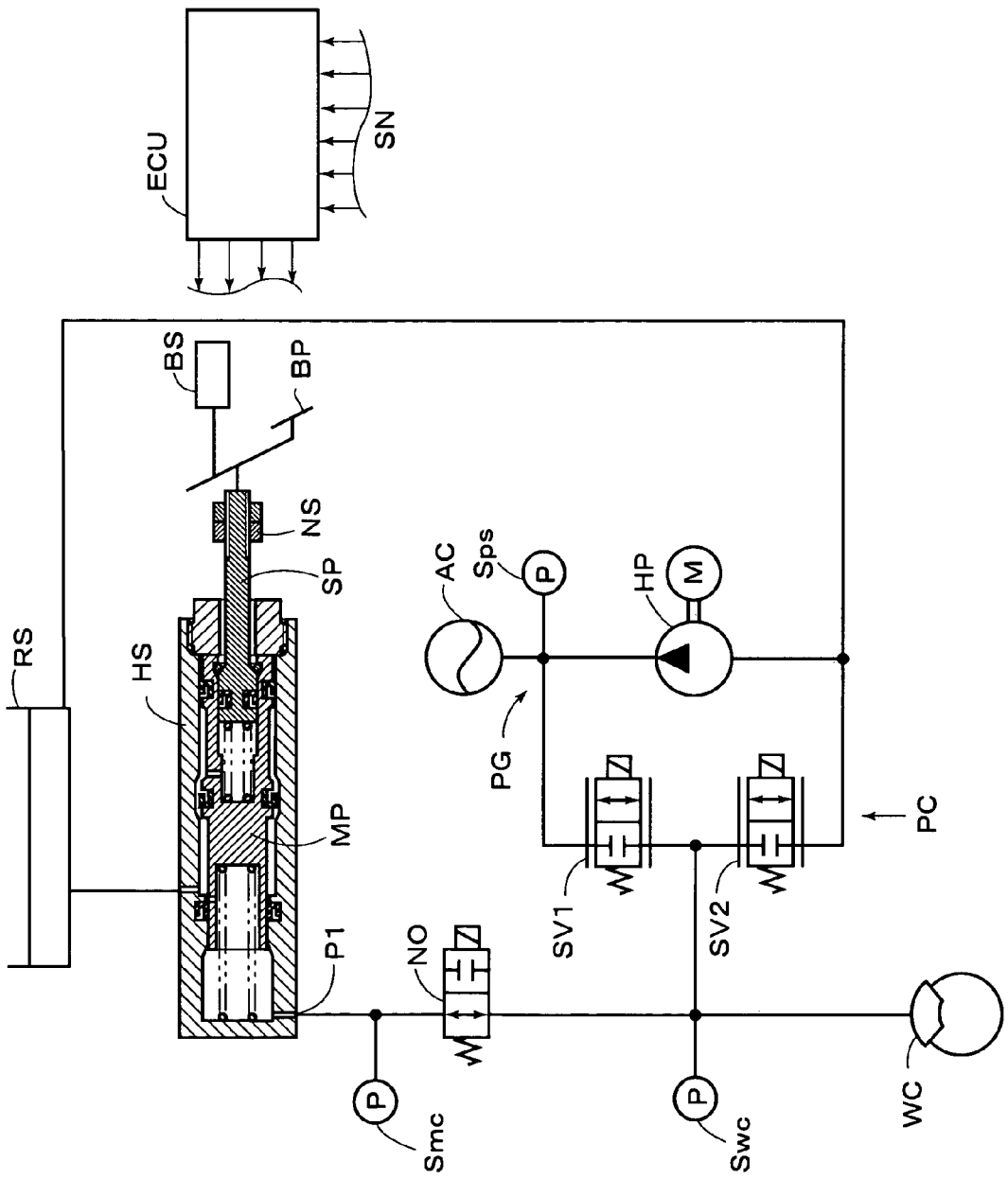
FIG. 2 is a schematic block diagram of a hydraulic brake apparatus having a hydraulic braking pressure generating apparatus according to an embodiment of the present invention.

The hydraulic braking pressure generating apparatus as described above is provided to constitute a hydraulic brake apparatus for a vehicle as shown in FIG. 2, wherein the port P1 is connected to a wheel brake cylinder WC operatively mounted on each wheel of the vehicle through a normally open electromagnetic switching valve NO. And, a pressure source PG for generating a certain hydraulic pressure irrespective of the braking operation of the vehicle driver is connected to a hydraulic passage between the switching valve NO and the wheel brake cylinder WC.

According to the present embodiment, the pressure source PG includes an electric motor M controlled by an electronic control unit ECU, and a hydraulic pressure pump HP, which is driven by the electric motor M, and whose inlet is connected to the reservoir RS, and whose outlet is connected to an accumulator AC. According to the present embodiment, a pressure sensor Sps is connected to the outlet, and the detected pressure is monitored by the electronic control unit ECU. On the basis of the monitored result, the motor M is controlled by the electronic control unit ECU to keep the hydraulic pressure in the accumulator AC between predetermined upper and lower limits. The accumulator AC is connected to a hydraulic passage between the switching valve NO and the wheel brake cylinder WC, through a first linear solenoid valve SV1 of a normally closed type, to regulate the hydraulic pressure discharged from the pressure source PG and supply it to the wheel brake cylinder WC. Also, the reservoir RS is connected to the hydraulic passage between the switching valve NO and wheel brake cylinder WC, through a second linear solenoid valve SV2 of a normally closed type, to reduce the pressure in the wheel brake cylinder WC and regulate it. Accordingly, a pressure control device PC is formed by the pressure source PG, first and second linear solenoid valves SV1 and SV2, electronic control unit ECU, and sensors as described below.

According to the present embodiment, a pressure sensor Smc is disposed in a hydraulic passage between the port P1 and the switching valve NO, and a pressure sensor Swc is disposed in a hydraulic passage between the switching valve NO and the wheel brake cylinder WC. On the brake pedal BP, a stroke sensor BS is operatively connected to detect its stroke. The signals detected by the sensors as described above are fed to the electronic control unit ECU. Thus, the hydraulic braking pressure discharged from the master cylinder MC, the hydraulic braking pressure in the wheel brake cylinder WC and the stroke of the brake pedal BP are monitored by those sensors. Furthermore, in order to achieve those controls including an anti-skid control or the like, sensors SN such as wheel speed sensors, acceleration sensor or the like have been provided, so that the signals detected by them are fed to the electronic control unit ECU.

Hereinafter, explained is operation of the hydraulic brake apparatus having the hydraulic braking pressure generating apparatus as constituted above. At the outset, when the pressure control device PC is normal, the switching valve NO is energized to be placed in its closed position, so that the communication between the port P1 and the wheel brake cylinder WC is blocked, and the hydraulic pressure discharged from the pressure source PG is supplied to the wheel brake cylinder WC in response to operation of the brake pedal BP, on the basis of the value detected by the stroke sensor BS and the pressure sensor Smc. That is, the electric current fed to the first and second linear solenoid valves SV1 and SV2 is controlled respectively, so that the wheel cylinder pressure detected by the pressure sensor Swc equals to a desired wheel cylinder pressure. Consequently, the hydraulic pressure controlled by the pressure control device PC in response to operation of the brake pedal BP is supplied to the wheel brake cylinder WC.

In the case where the pressure control device PC is normal as described above, according to the master cylinder MC, the master piston MP is not advanced substantially from such a position that the communication between the master pressure chamber C1 and the atmospheric pressure chamber C2 is blocked, i.e., the position advanced from the initial position of the master piston MP by the first stroke (D4). Therefore, the simulator chamber C4 is communicated with the atmospheric pressure chamber C2 and finally with the reservoir RS, through the clearance CL between the seal member S2 and the annular groove G2 formed in the housing HS, so that the simulator chamber C4 is under the atmospheric pressure. Accordingly, if the braking operation force applied to the simulator piston SP (first piston member) becomes equal to or greater than a compressive force for mounting the compression spring E2 in the stroke simulator SM, the compression spring E2 is compressed to provide the stroke of the simulator piston SP in response to the braking operation force. As a result, the stroke of the brake pedal BP is provided in response to the braking operation force.

On the contrary, in the case where the pressure control device PC including the pressure source PG and the like comes to be abnormal, the switching valve NO is de-energized (turned off) to be placed in its open position, so that the port P1 and the wheel brake cylinder WC are communicated with each other, as shown in FIG. 2. At the same time, the first and second linear solenoid valves SV1 and SV2 are de-energized (turned off) to be placed in their closed positions, respectively, so that the hydraulic pressure is not supplied from the pressure source PG to the wheel brake cylinder WC. In this state, therefore, when the brake pedal BP is depressed, to advance the master piston MP by the second stroke (D5) or more from the initial position in response to operation of the brake pedal BP, the seal member S2 will contact the large diameter bore B3 formed in the housing HS, to block the communication between the simulator chamber C4 and the atmospheric pressure chamber C2. Hereafter, therefore, the master piston MP (second piston member) will be advanced, without the compression spring E2 being compressed in response to operation of the brake pedal BP, i.e., almost without the simulator piston SP (first piston member) being moved relative to the master piston MP (second piston member), to discharge the hydraulic pressure from the master pressure chamber C1 to the wheel brake cylinder WC. In this case, the maximal stroke (D2) of the master piston MP (second piston member) has been set to be large enough to be capable of supplying the amount of brake fluid the wheel brake cylinder WC to produce a large braking force in response to operation of the brake pedal BP.

Next will be explained the operation of the apparatus when removing the air introduced into the brake fluid in the hydraulic braking circuit, i.e., the operation of the apparatus in case of a so-called air-bleeding operation. With a well-known air bleed plug (not shown) being opened, when the brake pedal BP served as the manually operated braking member is depressed, the simulator piston SP (first piston member) and the master piston MP (second piston member) are advanced together. When the piston stopper NS contacts the stopper NH screwed in the housing HS, the brake pedal BP is prevented from being depressed further. Therefore, the brake pedal BP can be appropriately prevented from being interfered with a vehicle floor or the like, during the air-bleeding operation for removing the air introduced into the brake fluid.

As described before, the maximal stroke (D1) of the simulator piston SP (first piston member) relative to the housing HS has been set to be smaller than the maximal stroke (D2) of the master piston MP (second piston member) relative to the housing HS. In the case where the restricted stroke has to be set for the brake pedal BP for each vehicle type, therefore, it is possible to supply the amount of brake fluid enough to ensure as large braking force as possible, in case of failure of the pressure control device PC. Alternatively, the maximal stroke (D1) may be set to be larger than the maximal stroke (D2).

Furthermore, the maximal stroke (D1) of the simulator piston SP (first piston member) relative to the housing HS has been set to be larger than the maximal stroke (D3) of the simulator piston SP (first piston member) relative to the master piston MP (second piston member). Consequently, the minimum amount of brake fluid enough to stop the vehicle could be supplied to the wheel brake cylinder WC, even if the changeover device was failed due to a failure of sealing property of the seal member S2, for example, whereby the stroke simulator SM could not be prevented from being advanced in case of failure of the pressure control device PC.

Figure 3:
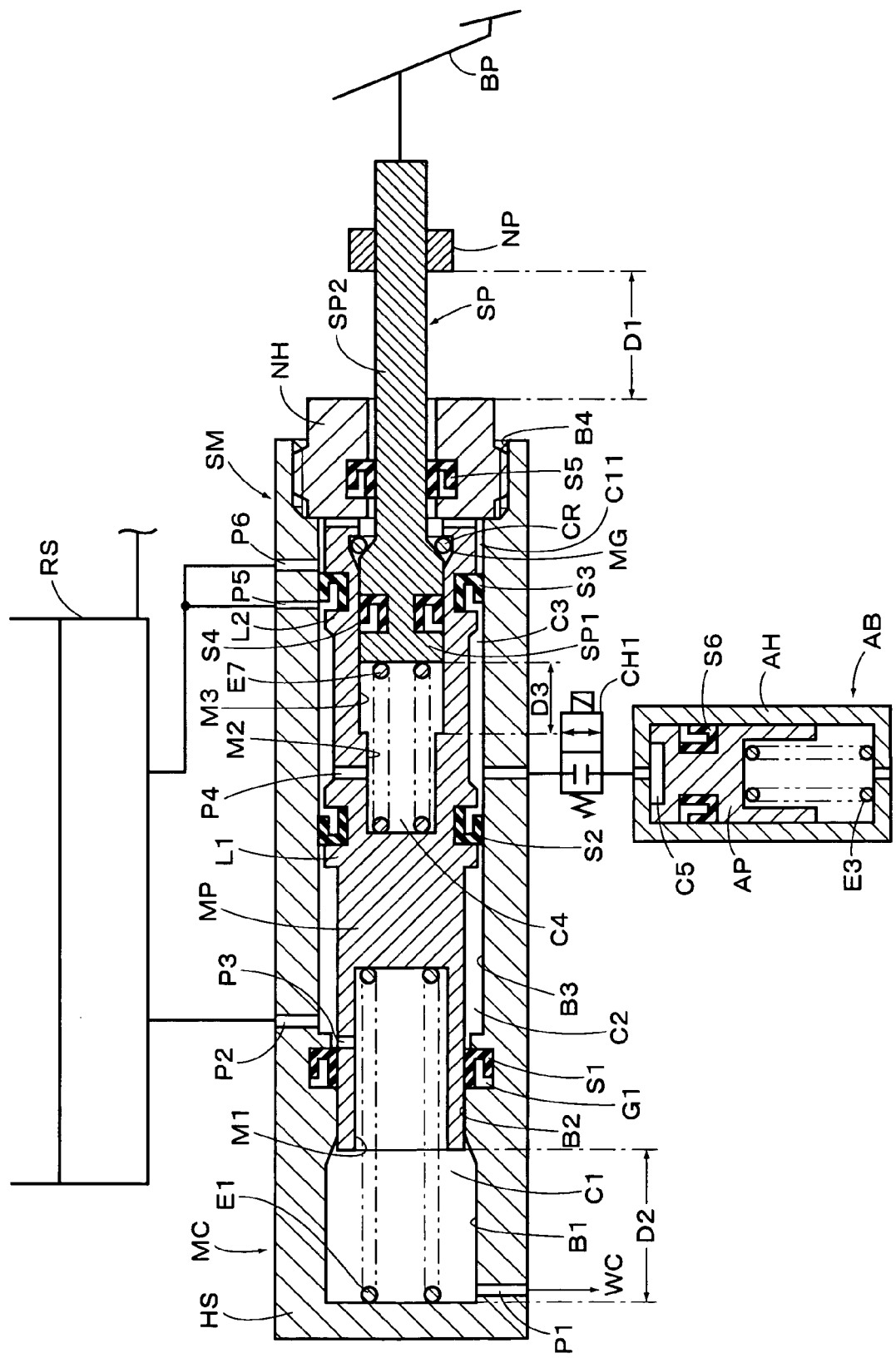
FIG. 3 is a sectional view of a hydraulic braking pressure generating apparatus for vehicles according to another embodiment of the present invention.

Next, another embodiment of the present invention is explained referring to FIG. 3, wherein structural elements equivalent to those described in FIG. 1 are designated by corresponding reference numerals. According to the present embodiment, the port P1 is connected to the wheel brake cylinder WC through the electromagnetic switching valve NO as shown in FIG. 2, and constituted in the same manner as shown in FIG. 2. According to the present embodiment, an absorbing device AB is provided for absorbing brake fluid of the amount determined in response to the hydraulic pressure discharged from the simulator chamber C4, to provide the stroke of the simulator piston SP (first piston member) in response to the braking operation force of the brake pedal BP. And, a changeover valve CH1 is provided as the changeover device for selectively providing an operative state of the absorbing device AB and an inoperative state thereof. The changeover valve CH1 is constituted by a normally closed electromagnetic switching valve, through which the annular chamber C3 is connected to the absorbing device AB. A compression spring E7 is accommodated in the small diameter bore M2 and large diameter bore M3 of the master piston MP to act as a return spring for the simulator piston SP. At the back of the seal member S3 (and in front of a seal member S5), there is defined an atmospheric pressure chamber C11, which is always communicated with the (atmospheric pressure) reservoir RS through a port P6. The seal member S5 is fitted into an annular groove formed inside of the stopper NH.

The absorbing device AB includes a cylindrical housing AH, and a piston member AP fluid-tightly and slidably received therein through a seal member S6, and a compression spring E3 for urging the piston member AP toward a hydraulic pressure chamber C5, which is communicated with the annular chamber C3, when the changeover valve CH1 is placed in its open position. In this embodiment, the maximal stroke (D1) of the simulator piston SP (first piston member) relative to the housing HS is restricted to be smaller than the sum of the maximal stroke (D2) of the master piston MP (second piston member) relative to the housing HS and the maximal stroke (D3) of the simulator piston SP (first piston member) relative to the master piston MP (second piston member), i.e., [D1<(D2+D3)]. At the same time, the maximal stroke (D1) of the simulator piston SP (first piston member) relative to the housing HS is set to be larger than the maximal stroke (D3) of the simulator piston SP (first piston member) relative to the master piston MP (second piston member), i.e., (D1>D3). According to the present embodiment, the piston stopper NP is stuffed (pressed) into the axial portion SP2 of the simulator piston SP to be fixed at a predetermined position, whereby the restricted stroke setting device is constituted.

Consequently, according to the present embodiment, in the case where the operation for removing the air introduced into the brake fluid in the hydraulic braking circuit is performed, when the brake pedal BP is depressed, the simulator piston SP (first piston member) and the master piston MP (second piston member) are advanced together. Whereas, when the piston stopper NP contacts the stopper NH in the housing HS, the brake pedal BP is prevented from being depressed further. Therefore, the brake pedal BP can be appropriately prevented from being interfered with the vehicle floor or the like.

Figure 4:
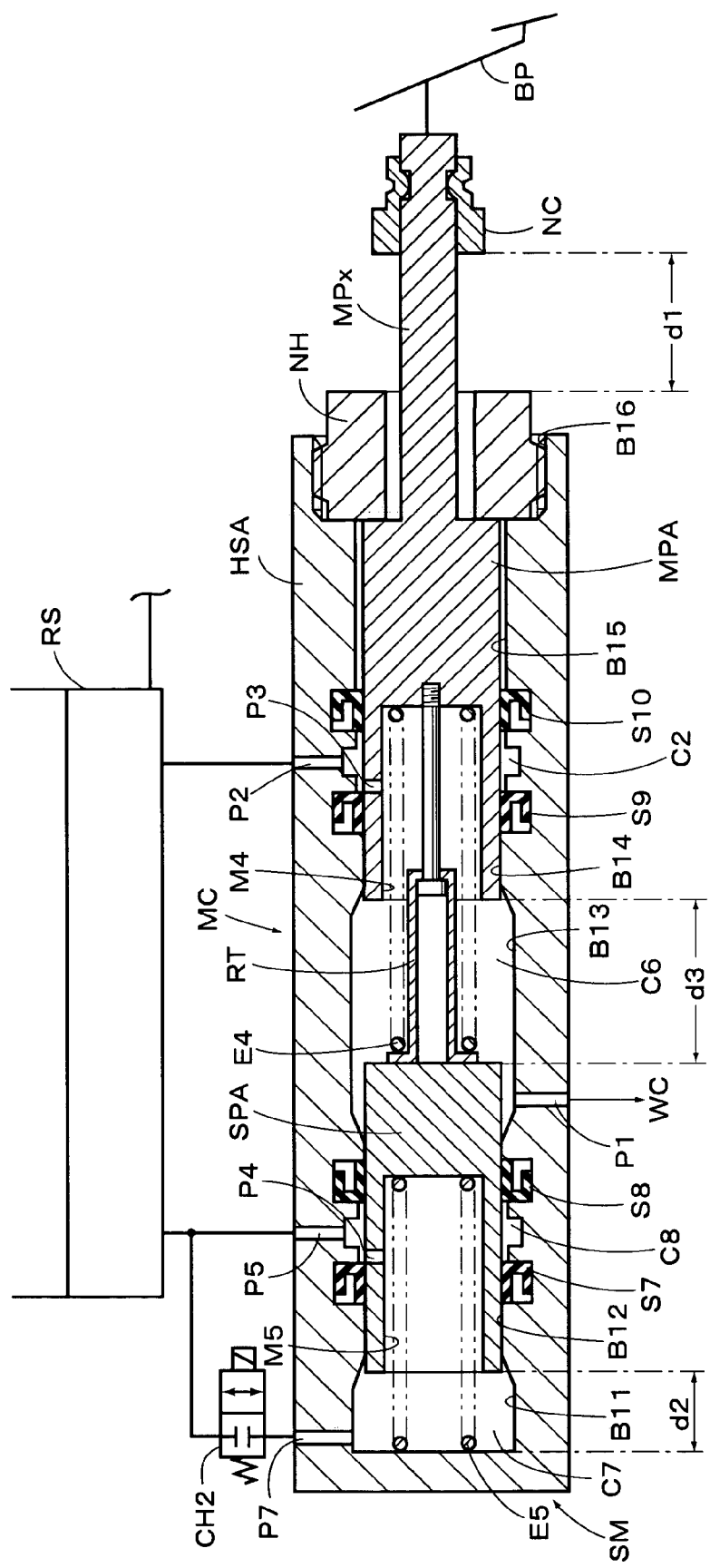
FIG. 4 is a sectional view of a hydraulic braking pressure generating apparatus for vehicles according to a further embodiment of the present invention.

FIG. 4 illustrates a further embodiment of the present invention, wherein structural elements equivalent to those as shown in FIG. 1 are designated by corresponding reference numerals. According to the present embodiment, the arrangement of the master piston MP and simulator piston SP as shown in FIG. 1 is reversed, whereby the ports P1 and P2 are formed at different places from the those as shown in FIG. 1. That is, in the present embodiment, a housing HSA is formed with a cylinder bore having a stepped bore of a recess B11, small diameter bores B12 and B14, and large diameter bores B13 and B15. At the rear end of the housing HSA, there is formed an open end portion B16 with threaded grooves formed on the inner surface thereof. A master pressure chamber C6 is defined in front of a master piston MPA served as the first piston member, and a simulator chamber C7 is defined in front of a simulator piston SPA served as the second piston member. On the inner surface of the small diameter bore B12, disposed are annular seal members S7 and S8 having a cup-like cross section respectively, between which an atmospheric pressure chamber C8 is defined. Likewise, on the inner surface of the small diameter bore B14, disposed are annular seal members S9 and S10 having a cup-like cross section respectively, between which an atmospheric pressure chamber C2 is defined. On the side wall of the housing HSA, there are formed a port P7 opening into the recess B11, a port P5 opening into the atmospheric pressure chamber C8, a port P1 opening into the master pressure chamber C6, and a port P2 opening into the atmospheric pressure chamber C2.

According to the present embodiment, the master piston MPA is formed with a recess M4 opened forward, and an axial portion MPx extended backward. Around the axial portion MPx at a predetermined position thereof, there is formed an annular groove, in which a piston stopper NC is deformed (caulked) to be fixed. The simulator piston SPA is formed with a recess M5 opened forward to define the simulator chamber C7 together with the recess B11, and placed in front of the master piston MPA. A compression spring E4 acting as a return spring is mounted between the master piston MPA and the simulator piston SPA through a retainer RT, and a master pressure chamber C6 is defined between them. Whereas, a compression spring E5 acting as the elastic member is received in the recess M5 of the simulator piston SPA, with its mounting load being set to be smaller than the mounting load of the compression spring E4. In the present embodiment, the rear master pressure chamber C6 is connected to the wheel brake cylinder WC through the normally open electromagnetic switching valve NO, whereas the front master pressure chamber C7 is connected to the reservoir RS through the port P7 and the changeover valve CH2 of a normally closed electromagnetic switching valve, which is served as the changeover device.

As shown in FIG. 4, the maximal stroke (d1) of the master piston MPA (first piston member) relative to the housing HSA (stopper NH) is restricted to be smaller than the sum of the maximal stroke (d2) of the simulator piston SPA (second piston member) relative to the housing HSA and the maximal stroke (d3) of the master piston MPA (first piston member) relative to the simulator piston SPA (second piston member), i.e., [d1<(d2+d3)]. Furthermore, the maximal stroke (d1) of master piston MPA (first piston member) relative to the housing HSA is set to be larger than the maximal stroke (d2) of the simulator piston SPA (second piston member) relative to the housing HSA. And, the restricted stroke setting device is constituted by the piston stopper NC.

Hereinafter, explained is operation of the hydraulic brake apparatus having the hydraulic braking pressure generating apparatus as constituted above. At the outset, when the pressure control device PC as shown in FIG. 2 is normal, the changeover valve CH2 as shown in FIG. 4 is placed in its open position, and the switching valve NO as shown in FIG. 2 is energized to be placed in its closed position, so that the communication between the port P1 and the wheel brake cylinder WC is blocked. In this state, with the pressure control device PC being controlled in the same manner as the aforementioned embodiment, the hydraulic pressure is supplied to the wheel brake cylinder WC in response to operation of the brake pedal BP. In this case, when the braking operation force applied to the simulator piston SPA (second piston member) is increased in response to operation of the brake pedal BP to exceed the mounting load of the compression spring E5, the compression spring E5 is compressed to advance the simulator piston SPA and master piston MPA in a body. When they are advanced by a distance to close the port P3 with the master piston MPA, the master pressure chamber C6 is shut off to provide a closed chamber. Thereafter, the master piston MPA will not be substantially moved relative to the simulator piston SPA, so that they will be advanced in a body. In this case, the simulator chamber C7 is under the atmospheric pressure, with the changeover valve CH2 being placed in its open position. Therefore, the compression spring E5 is compressed in response to operation of the brake pedal BP, to provide a stroke in response to the braking operation force, for the simulator piston SPA, and then the master piston MPA.

On the contrary, in the case where the pressure control device PC including the pressure source PG and the like comes to be abnormal, the changeover valve CH2 as shown in FIG. 4 is de-energized to be placed in its closed position, and the switching valve NO as shown in FIG. 2 is de-energized to be placed in its open position, so that the port P1 and the wheel brake cylinder WC are communicated with each other, as shown in FIG. 2. At the same time, the first and second linear solenoid valves SV1 and SV2 are de-energized (turned off) to be placed in their closed positions, respectively, so that the hydraulic pressure is not supplied from the pressure source PG to the wheel brake cylinder WC. In this state, therefore, when the brake pedal BP is depressed to advance the simulator piston SPA (second piston member) by the distance enough to close the port P4 with the simulator piston SPA, thereby to block the communication between the simulator chamber C7 and the reservoir RS. Hereafter, therefore, the simulator piston SPA (second piston member) will be almost stayed, instead the master piston MPA (first piston member) will be advanced in response to operation of the brake pedal BP, to discharge the hydraulic pressure from the master pressure chamber C6 (port P1) to the wheel brake cylinder WC.

According to the present embodiment, therefore, in the case where the air-bleeding operation is performed to remove the air introduced into the brake fluid in the hydraulic braking circuit, when the brake pedal BP is depressed, the master piston MPA (first piston member) and the simulator piston SPA (second piston member) are advanced together. When the piston stopper NC contacts the stopper NH in the housing HSA, the brake pedal BP is prevented from being depressed further. Therefore, the brake pedal BP can be appropriately prevented from being interfered with the vehicle floor or the like.

Furthermore, as the maximal stroke (d1) of the master piston MPA (first piston member) relative to the housing HSA has been set to be larger than the maximal stroke (d2) of the simulator piston SPA (second piston member) relative to the housing HSA, as described before. Consequently, the minimum amount of brake fluid enough to stop the vehicle could be supplied to the wheel brake cylinder WC, even if the changeover valve CH2 was failed, whereby the stroke simulator SM could not be prevented from being advanced in case of failure of the pressure control device PC.

Figure 5:
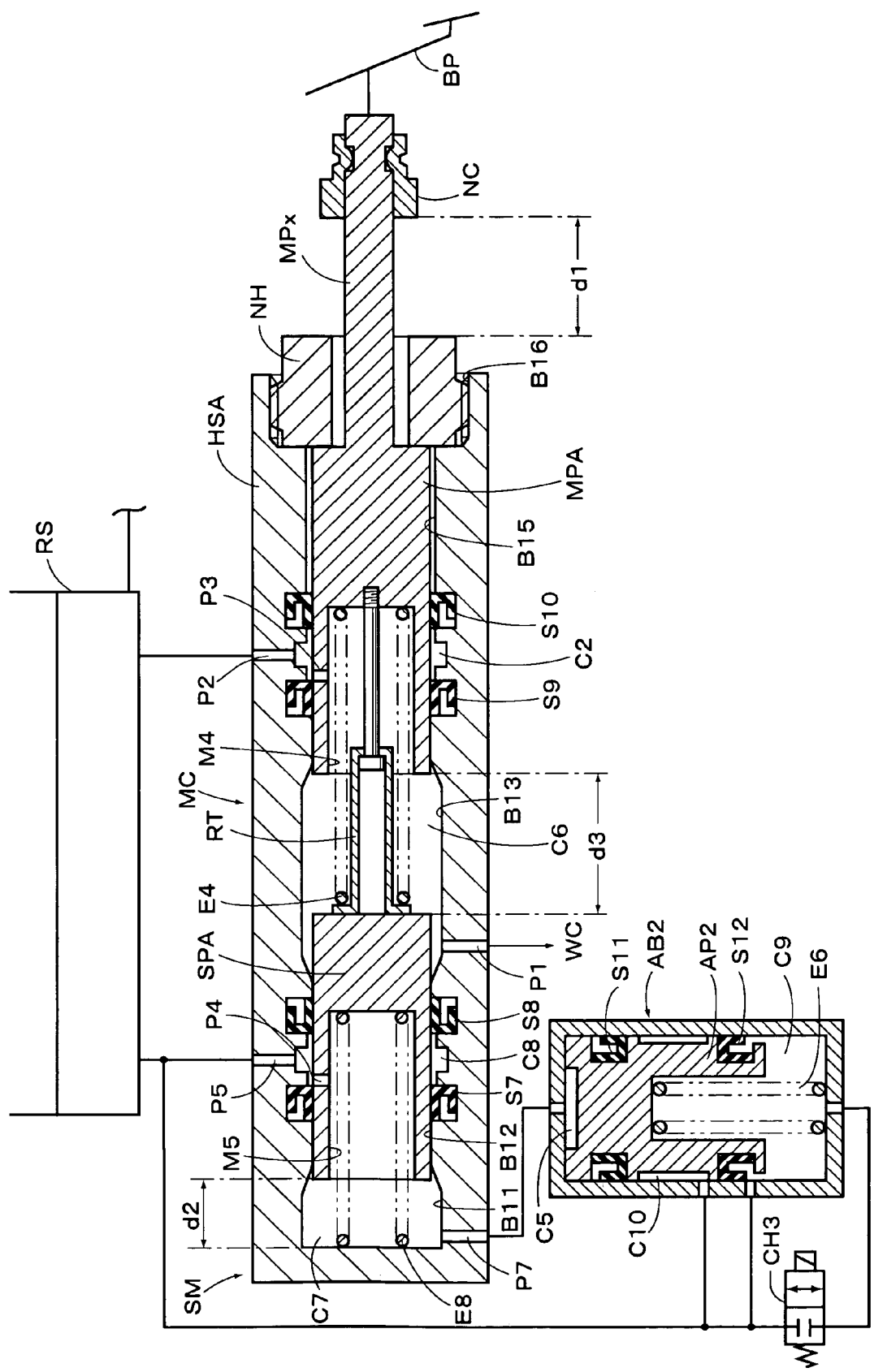
FIG. 5 is a sectional view of a hydraulic braking pressure generating apparatus for vehicles according to a yet further embodiment of the present invention.

FIG. 5 shows yet further embodiment of the present invention, wherein structural elements equivalent to those as shown in FIG. 4 are designated by corresponding reference numerals, and wherein the port P1 is connected to the wheel brake cylinder WC through the electromagnetic switching valve NO as shown in FIG. 2, and constituted in the same manner as shown in FIG. 2. According to the present embodiment, an absorbing device AB2 is provided for absorbing brake fluid of the amount determined in response to the hydraulic pressure discharged from the simulator chamber C7, to provide the stroke of the simulator piston SPA (second piston member) in response to the braking operation force of the brake pedal BP. And, a changeover valve CH3 constituted by a normally closed electromagnetic switching valve is provided as the changeover device for selectively providing an operative state of the absorbing device AB2 and an inoperative state thereof. And, a compression spring E8 is accommodated in the recess M5 of the simulator piston SPA to act as a return spring, with its mounting load being set to be smaller than the mounting load of the compression spring E4.

As shown in FIG. 5, the absorbing device AB2 is constituted such that a piston member AP2 is fluid-tightly and slidably received in a cylindrical housing through seal members S11 and S12, and a compression spring E6 is provided for urging the piston member AP2 toward the hydraulic pressure chamber C5. In the housing, there are defined a control chamber C9 and an atmospheric pressure chamber C10, which are divided by the seal member S12 mounted on the piston member AP2. The atmospheric pressure chamber C10 is always communicated with the reservoir RS, whereas the control chamber C9 is communicated with the reservoir RS when the piston member AP2 is placed in its initial position, and the communication between the control chamber C9 and the reservoir RS will be blocked by the seal member S12 in response to movement of the piston member AP2. Furthermore, the communication between the control chamber C9 and the reservoir RS will be controlled (communicated or blocked) by the changeover valve CH3 as described above.

According to the embodiment as shown in FIG. 5, the maximal stroke (d1) of the master piston MPA (first piston member) relative to the housing HSA is restricted to be smaller than the sum of the maximal stroke (d2) of the simulator piston SPA (second piston member) relative to the housing HSA and the maximal stroke (d3) of the master piston MPA (first piston member) relative to the simulator piston SPA (second piston member), i.e., [d1<(d2+d3)]. At the same time, the maximal stroke (d1) of the master piston MPA (first piston member) relative to the housing HSA (stopper NH) is set to be larger than the maximal stroke (d2) of the simulator piston SPA (second piston member) relative to the housing HSA. Consequently, according to the present embodiment, in the case where the operation for removing the air introduced into the brake fluid in the hydraulic braking circuit is performed, when the brake pedal BP is depressed, the master piston MPA (first piston member) and the simulator piston SPA (second piston member) are advanced together. Whereas, when the piston stopper NC contacts the stopper NH in the housing HSA, the brake pedal BP is prevented from being depressed further. Therefore, the brake pedal BP can be appropriately prevented from being interfered with the vehicle floor or the like. According to each of the embodiments as described above, the master cylinder may be formed to provide a tandem master cylinder having a couple of master pressure chambers.

Figure 6:
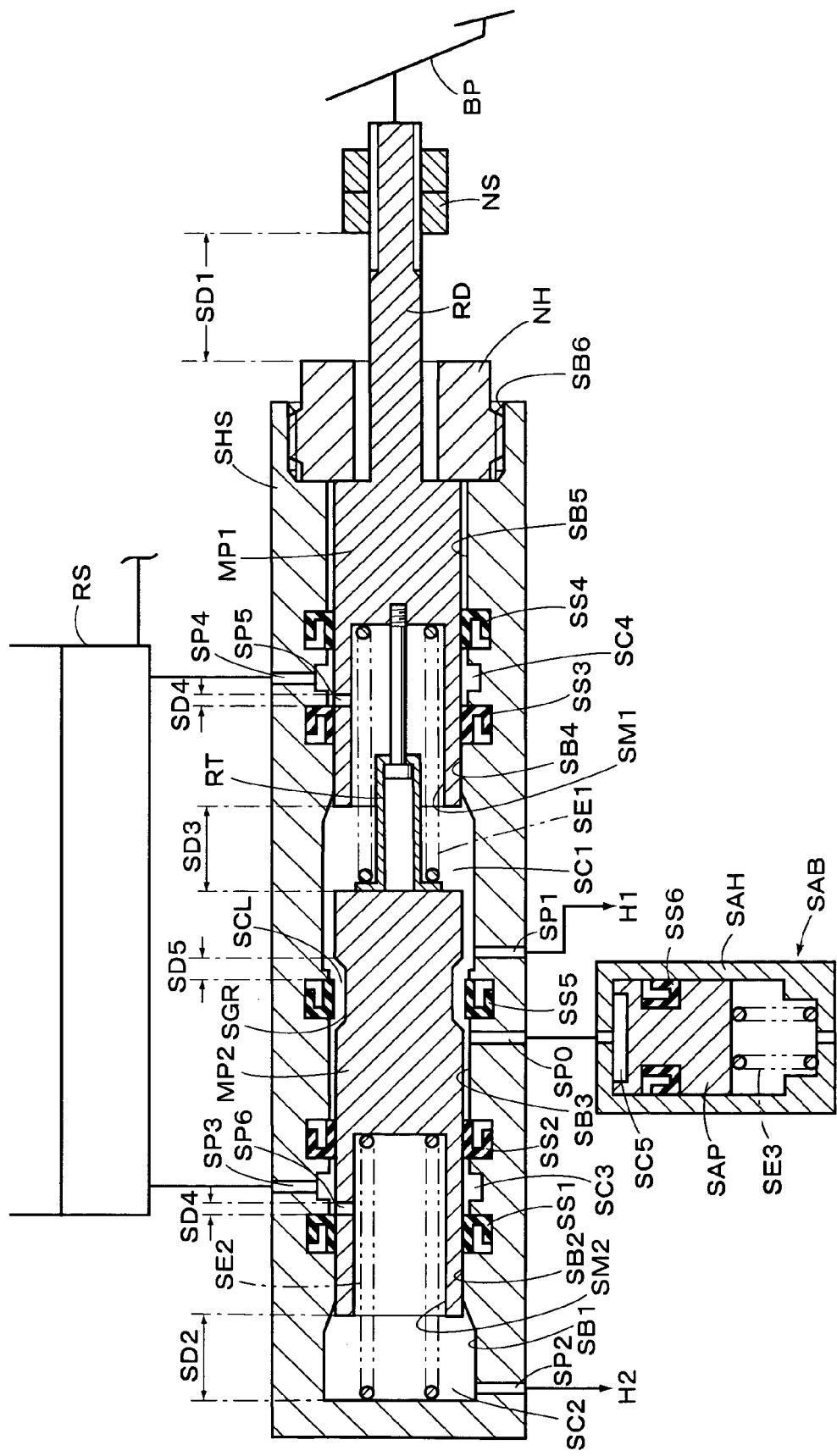
FIG. 6 is a sectional view of a hydraulic braking pressure generating apparatus for vehicles according to an embodiment of the apparatus with a separate stroke simulator of the present invention.

Next, referring to FIGS. 6–9, will be explained a hydraulic braking pressure generating apparatus according to an embodiment of the apparatus with a separate stroke simulator, wherein substantially the same structural elements as those described in FIGS. 1–5 are designated by corresponding reference numerals, and detailed explanation about those elements will be omitted hereinafter. As shown in FIG. 6, the hydraulic braking pressure generating apparatus of the present embodiment includes a stroke simulator SAB, which is provided separately from a housing SHS.

As shown in FIG. 6, a first master piston MP1 is slidably accommodated in a cylinder housing SHS (hereinafter, simply referred to as housing SHS), and connected to the brake pedal BP served as the manually operated braking member. Also, in the housing SHS, a second master piston MP2 is slidably accommodated in the housing SHS, so that a first master chamber SC1 is defined between the first master piston MP1 and the second master piston MP2, and a second master chamber SC2 is defined between the second master piston MP2 and the housing SHS. To be communicated with the first master chamber SC1, there is provided a stroke simulator SAB which is adapted to absorb brake fluid of the amount determined in response to the hydraulic pressure discharged from the first master chamber SC1, and which provides a stroke of the first master piston MP1 in response to braking operation force of the brake pedal BP.

The housing SHS is closed in its front end (left in FIG. 6) to be formed in a cylinder with a bottom, and formed with a cylinder bore having a recess SB1, a small diameter bore SB2, a large diameter bore SB3, and a stepped bore of a small diameter bore SB4 and a large diameter bore SB5. At the rear end of the housing SHS, there is formed an open end portion SB6 with threaded grooves formed on its inner surface. On the inner wall of the cylinder bore, are formed annular grooves for holding annular seal members SS1–SS5 having a cup-like cross section, respectively. An atmospheric pressure chamber SC3 is defined between the annular seal members SS1 and SS2, and an atmospheric pressure chamber SC4 is defined between the annular seal members SS3 and SS4. The housing SHS may be made of a single metallic member, because those annular grooves, the large diameter bore SB3 or the like can be formed by boring the housing SHS along the longitudinal axis thereof. On the side wall of the housing SHS, there are formed ports SP0 and SP1 opening into a front section and a rear section of the seal member SS5 in the large diameter bore SB3, respectively, a port SP2 opening into the second master chamber SC2 in the recess SB1, a port SP3 opening into the atmospheric pressure chamber SC3, and port SP4 opening into the atmospheric pressure chamber SC4. The ports SP3 and SP4 are communicated with the (atmospheric pressure) reservoir RS.

As for the first master piston MP1, there are formed at its front end a recess SM1 opening forward, and formed at its rear end a rod RD extending backward. On the side wall of the first master piston MP1, there is formed a port SP5 opening into the recess SM1. The second master piston MP2 is formed with a recess SM2 opening forward, and formed on its outer peripheral surface with an annular groove SGR having a certain width along the longitudinal axis. On the side wall of the second master piston MP2, there is formed a port SP6 opening into the recess SM2. Between the first and second master pistons MP1 and MP2, a compression spring SE1 is mounted through a retainer RT to act as a return spring, and a compression spring SE2 is accommodated in the recess SM2 to act as a return spring, as well.

Next will be explained the parts as described above, according to an example of a sequence of steps for assembling them. At the outset, the annular seal members SS1-SS5 are held in the annular grooves of the housing SHS. Next, the compression spring SE2 is received in the recess SB1 of the housing SHS and the recess SM2 of the second master piston MP2. Then, the second master piston MP2 with the seal members SS1 and SS2 mounted thereon is fluid-tightly and slidably received into the cylinder bore to define the second master chamber SC2 in front of the second master piston MP2. With the compression spring SE1 mounted through the retainer RT in the recess SM1, the first master piston MP1 is fluid-tightly and slidably fitted into the cylinder bore through the seal members SS3 and SS4, to define the first master chamber SC1 between the first and second master pistons MP1 and MP2. Consequently, those parts can be adjusted to provide a maximal stroke (SD3) of the first master piston MP1 relative to the second master piston MP2 as will be described later.

Thus, with the first and second master pistons MP1 and MP2 accommodated in the cylinder bore of the hosing SHS, screwed in the open end portion SB6 is the nut-like stopper NH with threaded grooves formed on its outer peripheral surface, which prevents the first and second master pistons MP1 and MP2 from being moved rearward against the biasing force of the compression spring SE2. Consequently, it can be adjusted such that a desired port idle (moving distance until shutting off the ports P5 and P6) is ensured, and that a maximal stroke (SD2) of the second master piston MP2 is set relative to the housing SHS. And, a maximal stroke (SD1) of the first master piston MP1 relative to the stopper NH (resultantly, housing SHS) is set by the piston stopper NS, which includes a pair of nuts. As it is so constituted that the nuts of the piston stopper NS are meshed with the threaded portion of the axial portion RD of the first master piston MP1 formed at the rear end portion thereof, and that the nuts are tightened from the opposite sides thereof, the nuts will be hardly rotated, after they are fixed at a predetermined position.

The distance (SD1) between the stopper NH and the piston stopper NS is set relative to each part with its dimension set in advance, to provide the following relationship. That is, with the fixed position of the piston stopper NS being adjusted relative to the axial portion RD of the first master piston MP1, the maximal stroke (SD1) of the first master piston MP1 relative to the housing SHS (stopper NH in FIG. 6) is restricted to be smaller than the sum of the maximal stroke (SD2) of the second master piston MP2 relative to the housing SHS and the maximal stroke (SD3) of the first master piston MP1 relative to the second master piston MP2, i.e., [SD1<(SD2+SD3)]. Thus, the piston stopper NS is served as the restricted stroke setting device. And, the stroke restriction device includes the piston stopper NS, by which a dimensional relationship of each part is adjusted.

Furthermore, the maximal stroke (SD2) of the second master piston MP2 relative to the housing SHS is set to be larger than half of the maximal stroke (SD1) of the first master piston MP1 relative to the housing SHS. Consequently, in the case where the restricted stroke has to be set for the brake pedal BP for each vehicle type, the maximum amount of brake fluid enough to ensure a large braking force could be supplied to wheel brake cylinders (WC1 and WC2 as shown in FIG. 7), in case of failure of a pressure control device (SPC as shown in FIG. 7), without setting the maximal stroke (SD2) of the second master piston MP2 relative to the housing SHS for each vehicle. Alternatively, the maximal stroke (SD1) may be set to be smaller than the maximal stroke (SD2). At the same time, the maximal stroke (SD2) of the second master piston MP2 relative to the housing SHS and the maximal stroke (SD3) of the first master piston MP1 relative to the second master piston MP2 may be set to be smaller or larger than the maximal stroke (SD1) of the first master piston MP1 relative to the housing SHS.

According to the present embodiment, there is provided a stroke simulator SAB, which absorbs brake fluid of the amount determined in response to the hydraulic pressure discharged from the first master chamber SC1, and provides a stroke of the first master piston MP1 in response to braking operation force of the brake pedal BP. And, the changeover device for selectively providing an operative state of the absorbing device SAB and an inoperative state thereof is constituted by the seal member SS5 which is disposed in the large diameter bore SB3 of the housing SHS, and the annular groove SGR which is formed on the position to be faced with the seal member SS5 when the second master piston MP2 is placed on its initial position. The stroke simulator SAB includes a cylindrical housing SAH, and a piston member SAP fluid-tightly and slidably received therein through a seal member SS6, and a compression spring SE3 for urging the piston member SAP toward a hydraulic pressure chamber SC5. The stroke simulator SAB is so constituted that the hydraulic pressure chamber SC5 is communicated with the first master chamber SC1 through a clearance SCL between the seal member SS5 and the annular groove SGR, until when the second master piston MP2 is advanced from its initial position by a predetermined distance (second stroke SD5) to contact the seal member SS5 at its outer peripheral surface.

With those parts assembled as described above, the first master chamber SC1 and the second master chamber SC2 are defined in front of the first master piston MP1 and second master piston MP2, respectively, in the housing SHS, to be communicated with the wheel brake cylinder WC1 and WC2 as shown in FIG. 7, through the ports SP1 and SP2 via hydraulic pressure circuits H1 and H2, respectively. When the first and second master pistons MP1 and MP2 are placed in their initial positions as shown in FIG. 6, the first and second master chambers SC1 and SC2 are communicated with the atmospheric pressure chambers SC4 and SC3 through the ports SP5 and SP6, and finally communicated with the reservoir RS under the atmospheric pressure, through the ports SP4 and SP3, respectively. Also, when the second master piston MP2 is placed in its initial position as shown in FIG. 6, the first master chamber SC1 under the atmospheric pressure is communicated with the pressure chamber SC5 through the clearance SCL. And, when the second master piston MP2 is advanced from its initial position by a first stroke SD4 (port idle) or more, the opening area of the port SP6 is closed by the seal member SS1, thereby to block the communication between the second master chamber SC2 and the atmospheric pressure chamber SC3. Likewise, when the first master piston MP1 is advanced from its initial position by the first stroke SD4 (port idle) or more, the opening area of the port SP5 is closed by the seal member SS3, thereby to block the communication between the first master chamber SC1 and the atmospheric pressure chamber SC4.

With the first master piston MP1 being advanced, the piston member SAP is pushed against the biasing force of the compression spring SE3 to expand the pressure chamber SC5, a stroke is given to the first master piston MP1. Thereafter, as the pressure chamber SC5 will be communicated with the first master chamber SC1 through the clearance SCL to actuate the stroke simulator SAB, until the second master piston MP2 will be advanced from its initial position by a predetermined distance (second stroke SD5) to contact the seal member SS5 at its outer peripheral surface. Therefore, in the case where the pressure control device SPC is normal, the hydraulic pressure circuits H1 and H2 are closed, i.e., the switching valves NO1 and NO2 as described later are placed to be in their closed positions, the second master piston MP2 will not be moved from the position of the first stroke SD4, except for the port idle as described above, whereas only the first master piston MP1 will be advanced, so that the stroke simulator SAB will be actuated as described above. On the contrary, in the case where the pressure control device SPC is failed, the hydraulic pressure circuits H1 and H2 are opened, i.e., the switching valves NO1 and NO2 are placed to be in their open positions, the first and second master pistons MP1 and MP2 will be advanced substantially evenly. And, when the first master piston MP1 is advanced from its initial position by the second stroke SD5 or more, the clearance SCL is shut off by the seal member SS5, whereby the stroke simulator SAB will not be actuated. Therefore, in response to advancement of the first and second master pistons MP1 and MP2, the hydraulic braking pressure will be supplied from the first and second master chambers SC1 and SC2 directly to the hydraulic pressure circuits H1 and H2, respectively.

The hydraulic braking pressure generating apparatus as described above is provided to constitute a hydraulic brake apparatus for a vehicle as shown in FIG. 7, wherein a normally open electromagnetic switching valve NO1 is disposed in the hydraulic pressure circuit H1, so that the apparatus is connected to a wheel brake cylinder (indicated by WC1) in one circuit through the switching valve NO1, and it is also connected to the pressure source PG for generating a certain hydraulic pressure irrespective of the braking operation of the vehicle driver, which pressure source PG is substantially the same as that described in FIG. 2, so that the detailed explanation will be omitted herein. Likewise, a normally open electromagnetic switching valve NO2 is disposed in the hydraulic pressure circuit H2, so that the apparatus is connected to a wheel brake cylinder (indicated by WC2) in the other one circuit through the switching valve NO2, and it is also connected to the pressure source PG. The accumulator AC is connected to a hydraulic passage between the switching valve NO1 and the wheel brake cylinder WC1 in the hydraulic pressure circuit H1, through a first linear solenoid valve SV1 of a normally closed type, to regulate the hydraulic pressure discharged from the pressure source PG and supply it to the wheel brake cylinder WC1. Also, the reservoir RS is connected to the hydraulic passage between the switching valve NO1 and wheel brake cylinder WC1, through a second linear solenoid valve SV2 of a normally closed type, to reduce the pressure in the wheel brake cylinder WC1 and regulate it. Likewise, in the hydraulic pressure circuit H2, the accumulator AC is connected to a hydraulic passage between the switching valve NO2 and the wheel brake cylinder WC2, through a first linear solenoid valve SV3 of a normally closed type, to regulate the hydraulic pressure discharged from the pressure source PG and supply it to the wheel brake cylinder WC2. Also, the reservoir RS is connected to the hydraulic passage between the switching valve NO2 and wheel brake cylinder WC2, through a second linear solenoid valve SV4 of a normally closed type, to reduce the pressure in the wheel brake cylinder WC2 and regulate it. According to the present embodiment, therefore, the pressure control device SPC is formed by the pressure source PG, first linear solenoid valves SV1 and SV3, second linear solenoid valves SV2 and SV4, electronic control unit ECU, and sensors as described hereinafter.

According to the present embodiment, the pressure sensor Smc is disposed at the upstream of the switching valve NO2, and the pressure sensor Swc is disposed at the downstream thereof and at the downstream of the switching valve NO1 in the hydraulic pressure circuit H1. On the brake pedal BP, the stroke sensor BS is operatively connected to detect its stroke. The signals detected by the sensors as described above are fed to the electronic control unit ECU. Thus, the hydraulic braking pressure discharged from the master chamber SC2, the hydraulic braking pressure in the wheel brake cylinders WC1 and WC2, and the stroke of the brake pedal BP are monitored by those sensors. The pressure sensor Smc may be disposed in the hydraulic pressure circuit H1, or in both of the hydraulic pressure circuits. Furthermore, in order to achieve those controls including the anti-skid control or the like, the sensors SN such as wheel speed sensors, acceleration sensor or the like have been provided, so that the signals detected by them are fed to the electronic control unit ECU.

Hereinafter, explained is operation of the hydraulic brake apparatus having the hydraulic braking pressure generating apparatus as constituted above. At the outset, in the case where the pressure control device SPC is normal, the switching valves NO1 and NO2 as shown in FIG. 7 are energized to be placed in their closed positions, so that the hydraulic pressure circuits H1 and H2 are shut off, and the hydraulic pressure discharged from the pressure source PG is supplied to the wheel brake cylinders WC1 and WC2 in response to operation of the brake pedal BP, on the basis of the value detected by the stroke sensor BS and the pressure sensor Smc. That is, the electric current fed to the first linear solenoid valves SV1 and SV3, and the second linear solenoid valves SV2 and SV4 will be controlled respectively, so that the wheel cylinder pressure detected by the pressure sensor Swc will be made equal to the desired wheel cylinder pressure. Consequently, the hydraulic pressure controlled by the pressure control device SPC in response to operation of the brake pedal BP is supplied to the wheel brake cylinders WC1 and WC2. In this case, the second master piston MP2 is advanced only by a distance approximately equal to the port idle (first stroke SD4), and will not be moved after the communication between the second master chamber SC2 and the atmospheric pressure chamber SC3 has been shut off, whereas only the first master piston MP1 will be advanced. In this case, as the first master chamber SC1 and the pressure chamber SC5 have been communicated with each other through the clearance SCL between the seal member SS5 and the groove SGR, when the braking operation force applied to the piston member SAP of the stroke simulator SAB is increased in response to operation of the brake pedal BP to exceed the mounting load of the compression spring SE3, the compression spring SE3 is compressed to provide the stroke of the first master piston MP1 in response to the braking operation force.

On the contrary, in the case where the pressure control device SPC including the pressure source PG and the like comes to be abnormal, the switching valves NO1 and NO2 are de-energized (turned off) to be placed in their open positions, so that the hydraulic pressure circuits H1 and H2 are in their communicated states as shown in FIG. 7. At the same time, the first linear solenoid valves SV1 and SV3 and the second linear solenoid valves SV2 and SV4 are de-energized (turned off) to be placed in their closed positions, respectively, so that the hydraulic pressure will not be supplied from the pressure source PG to the wheel brake cylinders WC1 and WC2. In this state, therefore, when the brake pedal BP is depressed, to advance the second master piston MP2 by the second stroke (SD5) or more from the initial position in response to operation of the brake pedal BP, its outer peripheral surface will contact the seal member SS5, to block the communication between the first master chamber SC1 and the pressure chamber SC5 in the stroke simulator SAB. Consequently, the first and second master pistons MP1 and MP2 will be advanced to compress the first and second master chambers SC1 and SC2, thereby to discharge the hydraulic pressure to the hydraulic pressure circuits H1 and H2 in response to operation of the brake pedal BP.

Next will be explained the so-called air-bleeding operation for removing the air introduced into the brake fluid in the hydraulic braking circuit. With the well-known air bleed plug (not shown) being opened, when the brake pedal BP is depressed, the first and second master pistons MP1 and MP2 are advanced together. When the piston stopper NS contacts the stopper NH in the housing SHS, the brake pedal BP is prevented from being depressed further. Therefore, the brake pedal BP can be appropriately prevented from being interfered with the vehicle floor or the like, during the operation for removing the air introduced into the brake fluid. Likewise, if the braking operation is made, with strong depressing force being applied, when the pressure control device SPC is failed, the first and second master pistons MP1 and MP2 will be advanced together, whereas the brake pedal BP will be prevented from being depressed further, when the piston stopper NS will contact the stopper NH in the housing SHS, whereby the brake pedal BP could be appropriately prevented from being interfered with the vehicle floor or the like. Furthermore, as the maximal stroke (SD2) of the second master piston MP2 relative to the housing SHS has been set to be larger than half of the maximal stroke (SD1) of the first master piston MP1 relative to the housing SHS, the maximum amount of brake fluid enough to ensure the large braking force could be supplied to the wheel brake cylinders WC1 and WC2, in case of failure of the pressure control device SPC, without setting the maximal stroke (SD2) of the second master piston MP2 relative to the housing SHS for each vehicle.

Figure 8:
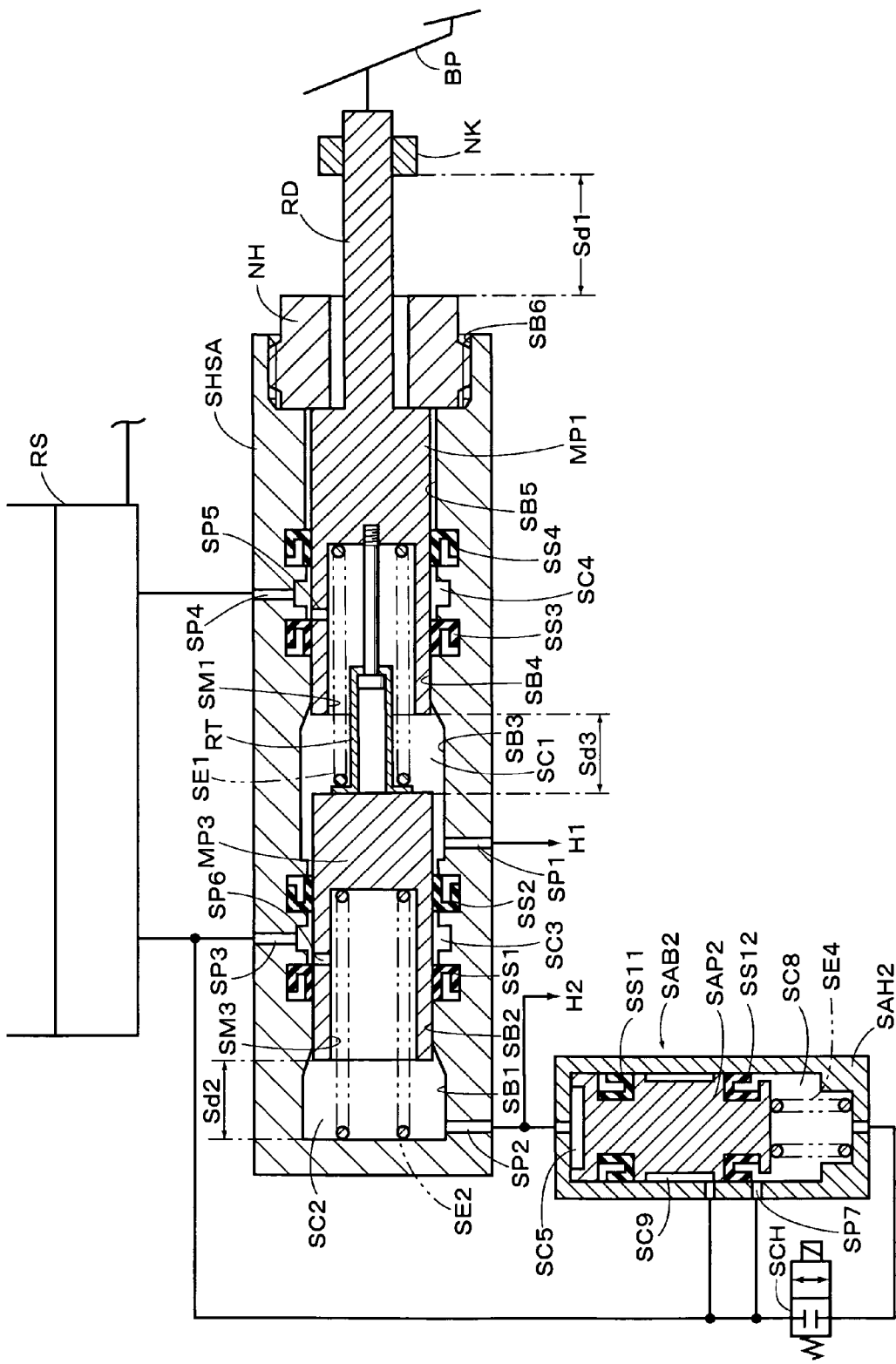
FIG. 8 is a sectional view of a hydraulic braking pressure generating apparatus for vehicles according to another embodiment with a separate stroke simulator of the present invention.
Figure 9:
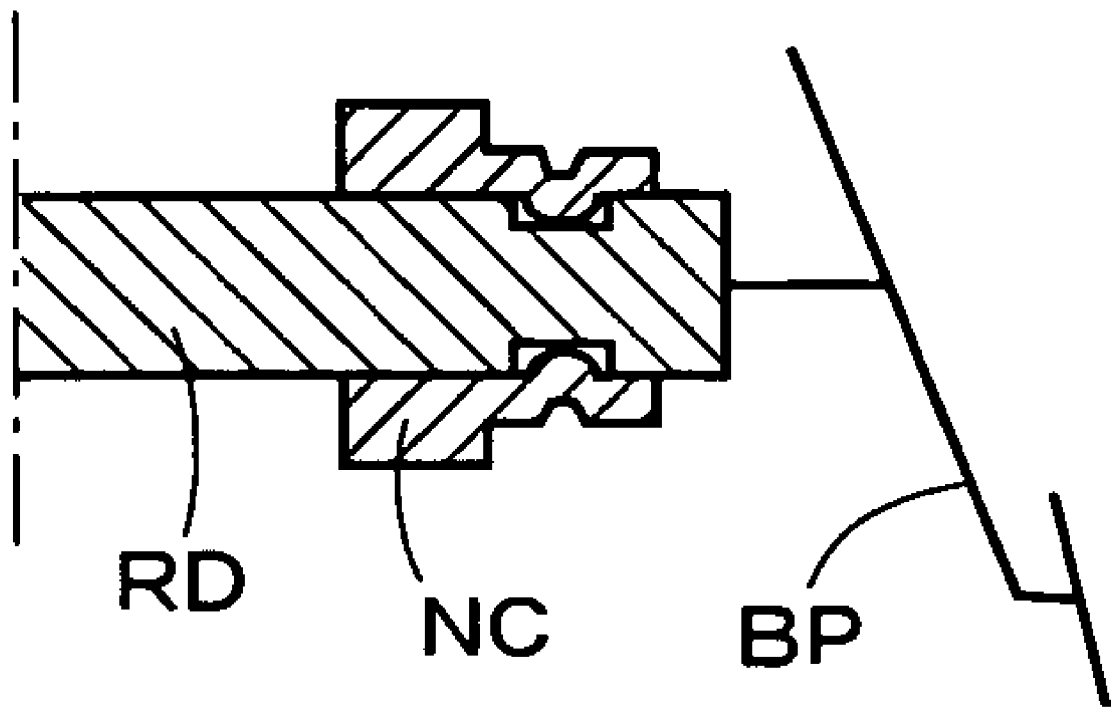
FIG. 9 is a sectional view of an example of a piston stopper deformed to be fixed on an axial portion of a master piston according to the embodiments as shown in FIGS. 6 and 8.

Next, another embodiment of the present invention is explained referring to FIG. 8, wherein structural elements equivalent to those described in FIG. 6 are designated by corresponding reference numerals. According to the present embodiment, a stroke simulator SAB2 is provided, and a changeover valve SCH of a normally closed electromagnetic valve is provided as the changeover device for selectively providing an operative state of the stroke simulator SAB2 and an inoperative state thereof. And, the second master chamber SC2 is connected to a pressure chamber SC5 of the stroke simulator SAB2. As the annular groove SGR of the second master piston MP2 as shown in FIG. 6 is not required for the second master piston according to the present embodiment, a second master piston MP3 is provided for the second master piston, with its recess SM3, in the present embodiment. According to the present embodiment, the piston stopper NK is stuffed (pressed) into the axial portion RD of the first master piston MP1 to be fixed at a predetermined position. With respect to the piston stopper to be used in FIGS. 6 and 8, the piston stopper NC as shown in FIG. 9 (like in FIGS. 4 and 5) may be deformed (caulked) to be fixed on the axial portion RD of the first master piston MP1.

As shown in FIG. 8, the stroke simulator SAB2 is constituted such that a piston member SAP2 is fluid-tightly and slidably received in a cylindrical housing SAH2 through seal members SS11 and SS12, and a compression spring SE4 is provided for urging the piston member SAP2 toward the hydraulic pressure chamber SC5. In the housing, there are defined a control chamber SC8 and an atmospheric pressure chamber SC9, which are divided by the seal member SS12 mounted on the piston member SAP2. The atmospheric pressure chamber SC9 is always communicated with the (atmospheric pressure) reservoir RS, whereas the control chamber SC8 is communicated with the reservoir RS through the port SP7 when the piston member SAP2 is placed in its initial position, and the communication between the control chamber SC8 and the reservoir RS will be blocked, with the opening of the port SP7 being closed by the seal member SS12 in response to movement of the piston member SAP2. Furthermore, the communication between the control chamber SC8 and the reservoir RS will be controlled (communicated or blocked) by the changeover valve SCH.

Accordingly, when the pressure control device SPC as shown in FIG. 7 is normal, the changeover valve SCH as shown in FIG. 8 is placed in its open position, and the switching valves NO1 and NO2 as shown in FIG. 7 are energized to be placed in their closed positions, so that the communication between the ports SP1 and SP2, and the wheel brake cylinders WC1 and WC2, is blocked, respectively. In this state, with the pressure control device SPC being controlled in the same manner as the aforementioned embodiment, the hydraulic pressure is supplied to the wheel brake cylinders WC1 and WC2 in response to operation of the brake pedal BP. In this case, after the first master piston MP1 was advanced by a distance approximately equal to the port idle, the first master chamber SC1 is shut off. Thereafter, the first master piston MP1 will not be substantially advanced relative to the second master piston MP3, so that they will be advanced in a body. With respect to the stroke simulator SAB2, however, the control chamber SC8 has been communicated with the reservoir RS through the changeover valve SCH placed in its open position. Consequently, the hydraulic pressure is discharged into the second master chamber SC2 in response to movement of the first and second master pistons MP1 and MP3. And, when the braking operation force applied to the piston member SAP2 is increased in response to operation of the brake pedal BP to exceed the mounting load of the compression spring SE4, the compression spring SE4 is compressed to provide the stroke of the piston member SAP2 (resultantly, the second master pistons MP3, and the first master piston MP1) in response to the braking operation force.

On the contrary, in the case where the pressure control device SPC including the pressure source PG and the like comes to be abnormal, the changeover valve SCH as shown in FIG. 8 is de-energized to be placed in its closed position, and the switching valves NO1 and NO2 as shown in FIG. 7 are de-energized to be placed in their open positions, so that the first and second master chambers SC1 and SC2 will be communicated with the wheel brake cylinders WC1 and WC2, respectively. At the same time, the first linear solenoid valves SV1 and SV3 and the second linear solenoid valves SV2 and SV4 are de-energized (turned off) to be placed in their closed positions, respectively, so that the hydraulic pressure is not supplied from the pressure source PG to the wheel brake cylinders WC1 and WC2. In this state, therefore, after the piston member SAP2 has been moved by the distance enough to close the port SP7, the communication between the control chamber SC8 and the reservoir RS is blocked, whereby even if the brake pedal BP was depressed, the piston member SAP2 could not be moved. Hereafter, therefore, the piston member SAP2 will be almost stayed, instead the first and second master pistons MP1 and MP3 will be advanced in response to operation of the brake pedal BP, to discharge the hydraulic pressure from the first and second master chambers SC1 and SC2 to the wheel brake cylinders WC1 and WC2.

According to the embodiment as shown in FIG. 8, the maximal stroke (Sd1) of the first master piston MP1 relative to the housing SHSA is restricted to be smaller than the sum of the maximal stroke (Sd2) of the second master piston MP3 relative to the housing SHSA and the maximal stroke (Sd3) of the first master piston MP1 relative to the second master piston MP3, i.e., [Sd1<(Sd2+Sd3)]. At the same time, it is preferable that the maximal stroke (Sd3) of the second master piston MP3 relative to the first master piston MP1 is set to be larger than a half of the maximal stroke (Sd1) of the first master piston MP1 relative to the housing SHSA (stopper NH), while the maximal stroke (Sd3) may be set to be smaller than that value. In the case where the operation for removing the air introduced into the brake fluid is made, or where the braking operation is made with strong depressing force being applied, therefore, the first and second master pistons MP1 and MP3 will be advanced together, when the brake pedal BP is depressed, whereas the brake pedal BP will be prevented from being depressed further, when the piston stopper NK will contact the stopper NH in the housing SHS, whereby the brake pedal BP could be appropriately prevented from being interfered with the vehicle floor or the like. Furthermore, as the maximal stroke (Sd3) of the second master piston MP3 relative to the first master piston MP1 has been set to be larger than half of the maximal stroke (Sd1) of the first master piston MP1 relative to the housing SHSA, the maximum amount of brake fluid enough to ensure the large braking force could be supplied to the wheel brake cylinders WC1 and WC2, in case of failure of the pressure control device SPC, without setting the maximal stroke (Sd3) of the second master piston MP3 relative to the first master piston MP1 for each vehicle.

It should be apparent to one skilled in the art that the above-described embodiments are merely illustrative of but one of the many possible specific embodiments of the present invention. Numerous and various other arrangements can be readily devised by those skilled in the art without departing from the spirit and scope of the invention as defined in the following claims.

What is claimed is:

1. A hydraulic braking pressure generating apparatus for vehicles, comprising:
   a first piston member moved back and forth in response to operation of a manually operated braking member;
   an elastic member for providing a stroke of said first piston member in response to braking operation force of said manually operated braking member;
   a second piston member slidably accommodated in a cylinder housing for defining a master pressure chamber in front of said second piston member, and defining a simulator chamber behind said second piston member and in front of said first piston member, said second piston member being moved back and forth in response to the braking operation force of said manually operated braking member transmitted to said second piston member through said first piston member and said elastic member;
   an atmospheric pressure reservoir for storing brake fluid under atmospheric pressure;
   changeover means for selectively providing a communicating state for communicating said simulator chamber with said atmospheric pressure reservoir, and a cut-off state for blocking the communication between said simulator chamber and said atmospheric pressure reservoir; and
   stroke restriction means for restricting a maximal stroke of said first piston member relative to said cylinder housing to be smaller than the sum of a maximal stroke of said second piston member relative to said cylinder housing and a maximal stroke of said first piston member relative to said second piston member.

2. A hydraulic braking pressure generating apparatus for vehicles as set forth in claim 1, wherein said stroke restriction means sets the maximal stroke of said first piston member relative to said cylinder housing to be larger than the maximal stroke of said first piston member relative to said second piston member.

3. A hydraulic braking pressure generating apparatus for vehicles as set forth in claim 1, wherein said stroke restriction means includes restricted stroke setting means for adjusting the maximal stroke of said first piston member relative to said cylinder housing.

4. A hydraulic braking pressure generating apparatus for vehicles as set forth in claim 3, wherein said restricted stroke setting means includes a first piston stopper screwed into said first piston member.

5. A hydraulic braking pressure generating apparatus for vehicles as set forth in claim 3, wherein said restricted stroke setting means includes a second piston stopper stuffed into said first piston member.

6. A hydraulic braking pressure generating apparatus for vehicles as set forth in claim 3, wherein said restricted stroke setting means includes a third piston stopper deformed to fix said first piston member.

7. A hydraulic braking pressure generating apparatus for vehicles, comprising:
   a first piston member moved back and forth in response to operation of a manually operated braking member;
   a second piston member slidably accommodated in a cylinder housing for defining a master pressure chamber in front of said second piston member, and defining a simulator chamber at the back of said second piston member and in front of said first piston member, said second piston member being moved back and forth in response to the braking operation force of said manually operated braking member transmitted to said second piston member through said first piston member and hydraulic pressure in said simulator chamber;
   absorbing means for absorbing brake fluid of the amount determined in response to the hydraulic pressure discharged from said simulator chamber, said absorbing means providing a stroke of said first piston member in response to the braking operation force of said manually operated braking member;
   changeover means for selectively providing an operative state of said absorbing means and an inoperative state of said absorbing means; and
   stroke restriction means for restricting a maximal stroke of said first piston member relative to said cylinder housing to be smaller than the sum of a maximal stroke of said second piston member relative to said cylinder housing and a maximal stroke of said first piston member relative to said second piston member.

8. A hydraulic braking pressure generating apparatus for vehicles as set forth in claim 7, wherein said stroke restriction means sets the maximal stroke of said first piston member relative to said cylinder housing to be larger than the maximal stroke of said first piston member relative to said second piston member.

9. A hydraulic braking pressure generating apparatus for vehicles as set forth in claim 7, wherein said stroke restriction means includes restricted stroke setting means for adjusting the maximal stroke of said first piston member relative to said cylinder housing.

10. A hydraulic braking pressure generating apparatus for vehicles, comprising:
    a first piston member slidably accommodated in a cylinder housing for defining a master pressure chamber in front of said first piston member, said first piston member being moved back and forth in response to operation of a manually operated braking member;
    a second piston member slidably accommodated in said cylinder housing for defining a simulator chamber in front of said second piston member, said second piston member being moved back and forth in response to the braking operation force of said manually operated braking member transmitted to said second piston member through said first piston member and hydraulic pressure in said master pressure chamber;
    an elastic member for providing a stroke of said second piston member in response to braking operation force of said manually operated braking member;
    an atmospheric pressure reservoir for storing brake fluid under atmospheric pressure;
    changeover means for selectively providing a communicating state for communicating said simulator chamber with said atmospheric pressure reservoir, and a cut-off state for blocking the communication between said simulator chamber and said atmospheric pressure reservoir; and
    stroke restriction means for restricting a maximal stroke of said first piston member relative to said cylinder housing to be smaller than the sum of a maximal stroke of said second piston member relative to said cylinder housing and a maximal stroke of said first piston member relative to said second piston member.

11. A hydraulic braking pressure generating apparatus for vehicles as set forth in claim 10, wherein said stroke restriction means sets the maximal stroke of said first piston member relative to said cylinder housing to be larger than the maximal stroke of said second piston member relative to said cylinder housing.

12. A hydraulic braking pressure generating apparatus for vehicles as set forth in claim 10, wherein said stroke restriction means includes restricted stroke setting means for adjusting the maximal stroke of said first piston member relative to said cylinder housing.

13. A hydraulic braking pressure generating apparatus for vehicles, comprising:
    a first piston member slidably accommodated in a cylinder housing for defining a master pressure chamber in front of said first piston member, said first piston member being moved back and forth in response to operation of a manually operated braking member;
    a second piston member slidably accommodated in said cylinder housing for defining a simulator chamber in front of said second piston member, said second piston member being moved back and forth in response to the braking operation force of said manually operated braking member transmitted to said second piston member through said first piston member and hydraulic pressure in said master pressure chamber;
    absorbing means communicated with said simulator chamber for absorbing brake fluid of the amount determined in response to the hydraulic pressure discharged from said simulator chamber, said absorbing means providing a stroke of said second piston member in response to the braking operation force of said manually operated braking member;
    changeover means for selectively providing an operative state of said absorbing means and an inoperative state of said absorbing means; and stroke restriction means for restricting a maximal stroke of said first piston member relative to said cylinder housing to be smaller than the sum of a maximal stroke of said second piston member relative to said cylinder housing and a maximal stroke of said first piston member relative to said second piston member.

14. A hydraulic braking pressure generating apparatus for vehicles as set forth in claim 13, wherein said stroke restriction means sets the maximal stroke of said first piston member relative to said cylinder housing to be larger than the maximal stroke of said second piston member relative to said cylinder housing.

15. A hydraulic braking pressure generating apparatus for vehicles as set forth in claim 13, wherein said stroke restriction means includes restricted stroke setting means for adjusting the maximal stroke of said first piston member relative to said cylinder housing.

16. A hydraulic braking pressure generating apparatus for vehicles, comprising:
- a first master piston slidably accommodated in a cylinder housing for being moved back and forth in response to operation of a manually operated braking member;
- a second master piston slidably accommodated in said cylinder housing for defining a first master chamber between said first master piston and said second master piston, and defining a second master chamber between said second master piston and said cylinder housing;
- a stroke simulator communicated with one of said first master chamber and said second master chamber for absorbing brake fluid of the amount determined in response to the hydraulic pressure discharged from the one of said first master chamber and said second master chamber, said stroke simulator providing a stroke of one of said first master piston and said second master piston for discharging the hydraulic pressure to the one of said first master chamber and said second master chamber, in response to braking operation force of said manually operated braking member;
- changeover means for selectively providing an operative state of said stroke simulator and an inoperative state of said stroke simulator; and
- stroke restriction means for restricting a maximal stroke of said first master piston relative to said cylinder housing to be smaller than the sum of a maximal stroke of said second master piston relative to said cylinder housing and a maximal stroke of said first master piston relative to said second master piston.

17. A hydraulic braking pressure generating apparatus for vehicles as set forth in claim 16, wherein said stroke restriction means includes restricted stroke selling means for adjusting the maximal stroke of said first master piston relative to said cylinder housing.

18. A hydraulic braking pressure generating apparatus for vehicles as set forth in claim 17, wherein said restricted stroke setting means includes a first piston stopper screwed into said first master piston.

19. A hydraulic braking pressure generating apparatus for vehicles as set forth in claim 17, wherein said restricted stroke setting means includes a second piston stopper stuffed into said first master piston.

20. A hydraulic braking pressure generating apparatus for vehicles as set forth in claim 17, wherein said restricted stroke setting means includes a third piston stopper deformed to fix said first master piston.

* * * * *